(12) United States Patent
Pringle, IV et al.

(10) Patent No.: US 10,335,823 B2
(45) Date of Patent: Jul. 2, 2019

(54) APPARATUSES FOR APPLYING GLUTINOUS SUBSTANCES TO SEAMS

(71) Applicant: The Boeing Company, Chicago, IL (US)

(72) Inventors: John W. Pringle, IV, Gardenia, CA (US); Martin Guirguis, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 139 days.

(21) Appl. No.: 15/474,344

(22) Filed: Mar. 30, 2017

(65) Prior Publication Data

US 2018/0281297 A1    Oct. 4, 2018

(51) Int. Cl.
| | | |
|---|---|---|
| *B05C 1/00* | (2006.01) | |
| *B05C 1/08* | (2006.01) | |
| *B29C 65/52* | (2006.01) | |

(52) U.S. Cl.
CPC ............... *B05C 1/00* (2013.01); *B05C 1/006* (2013.01); *B05C 1/0808* (2013.01); *B05C 1/0813* (2013.01); *B05C 1/0817* (2013.01); *B29C 65/526* (2013.01)

(58) Field of Classification Search
CPC ....... B29C 65/526; B05C 1/08; B05C 1/0808; B05C 1/0813; B05C 1/0817; F16B 11/006
See application file for complete search history.

(56) References Cited

U.S. PATENT DOCUMENTS

| | | | | |
|---|---|---|---|---|
| 2,022,777 | A * | 12/1935 | MacKenzie | .......... A43D 25/181 118/261 |
| 2,029,056 | A * | 1/1936 | Carlson | ................ A45D 34/041 222/368 |
| 3,956,604 | A * | 5/1976 | Larker | .................... B21C 31/00 200/61.08 |
| 4,667,879 | A * | 5/1987 | Muller | .................. B05C 5/0258 118/113 |
| 6,517,891 | B1 * | 2/2003 | Estelle | .................. B05B 12/085 427/424 |
| 2005/0048196 | A1 * | 3/2005 | Yanagita | ............... B05B 12/085 427/8 |

* cited by examiner

*Primary Examiner* — Alex B Efta
(74) *Attorney, Agent, or Firm* — Kwan & Olynick LLP

(57) ABSTRACT

An applicator, for applying a glutinous substance to a seam between a first part and a second part, comprises a roller, comprising a circumferential surface, and a housing, comprising a delivery port, a scraper, and a shaper. The roller is coupled to the housing and is rotatable relative to the housing about an axis. The circumferential surface of the roller is communicatively coupled with the delivery port. The intersection of the circumferential surface and a virtual plane, passing through the axis, is a non-linear segment. The scraper is geometrically complementary at least with the non-linear segment. The shaper is communicatively coupled with the scraper.

47 Claims, 26 Drawing Sheets

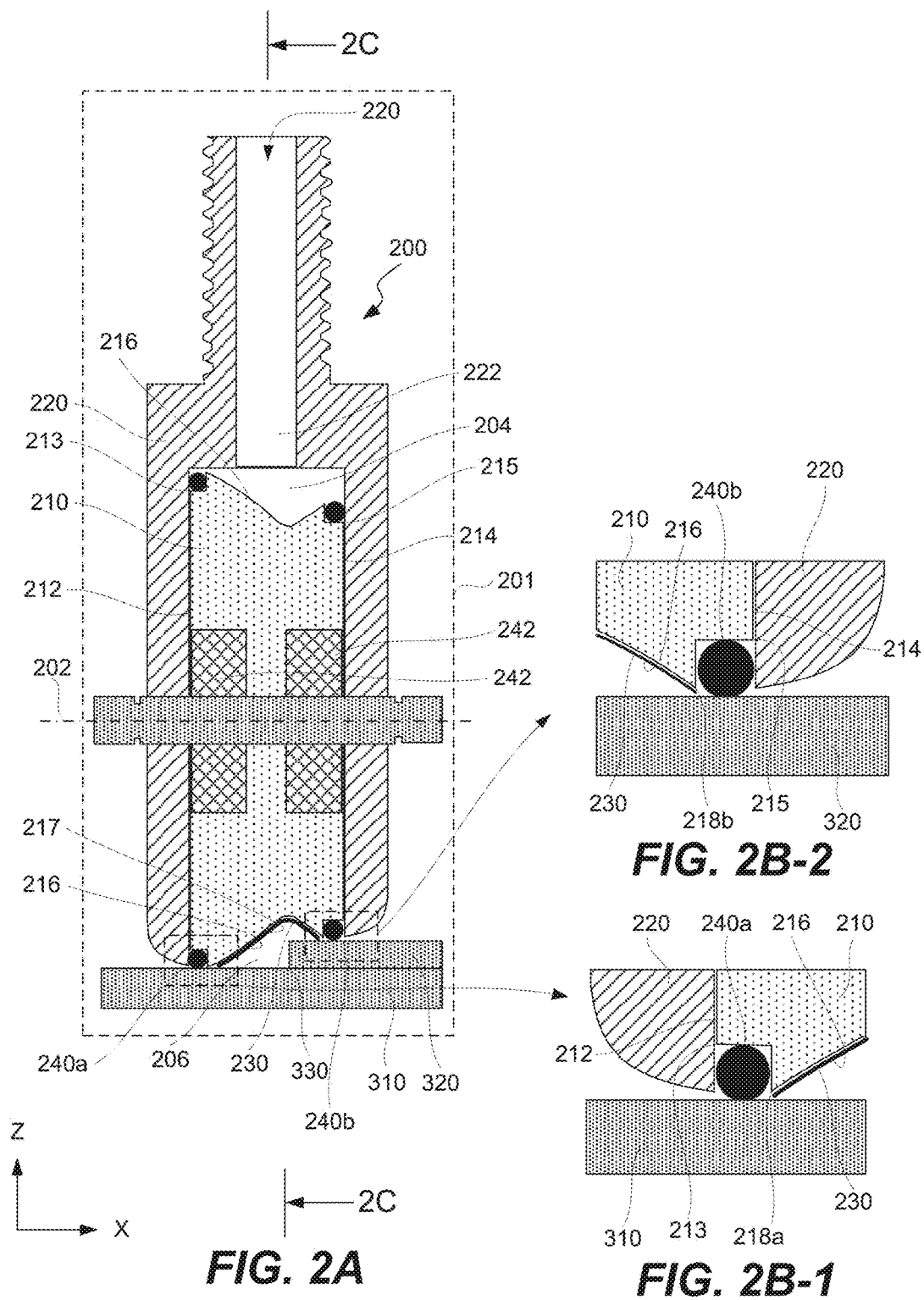

APPARATUSES FOR APPLYING GLUTINOUS SUBSTANCES TO SEAMS

TECHNICAL FIELD

The present disclosure relates to apparatuses and methods for applying glutinous substances to seams.

BACKGROUND

Manually applying a glutinous substance, such as a sealant, to a seam may be challenging because the operator must control both the delivery rate of a glutinous substance to the seam and the speed with which an applicator, such as a caulking gun, travels relative to the seam. When the operator's technique is improper, the seam may receive an excessive amount of the glutinous substance (e.g., if the delivery rate is too fast and/or if the tip travel speed is too slow) or an insufficient amount (e.g., if the delivery rate is too slow and/or the tip travel speed is too fast). Furthermore, in certain circumstances, proper alignment the applicator relative to the seam may also present a challenge.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an applicator for applying a glutinous substance to a seam between a first part and a second part. The applicator comprises a roller. The roller comprises a first lateral surface, a second lateral surface opposite of the first lateral surface, and a circumferential surface, separating the first lateral surface and the second lateral surface. The applicator further comprises a housing, comprising a delivery port, a scraper, and a shaper. The roller is coupled to the housing and is rotatable relative to the housing about an axis. The housing at least partially encloses the circumferential surface of the roller. The circumferential surface of the roller is communicatively coupled with the delivery port. The first lateral surface and the second lateral surface are isolated from the delivery port. The intersection of the circumferential surface of the roller and a virtual plane, passing through the axis, is a non-linear segment. The scraper is geometrically complementary at least with the non-linear segment of the circumferential surface of the roller. The shaper is communicatively coupled with the scraper.

Another example of the subject matter according to the invention relates to an applicator system for applying a glutinous substance to a seam between a first part and a second part. The applicator system comprises an applicator, a glutinous-substance source, and a system controller. The applicator comprises a roller, which comprises a first lateral surface, a second lateral surface opposite of the first lateral surface, and a circumferential surface, separating the first lateral surface and the second lateral surface. The applicator further comprises a housing, which comprises a delivery port, a scraper, and a shaper. The roller is coupled to the housing and is rotatable relative to the housing about an axis. The housing at least partially encloses the circumferential surface of the roller. The circumferential surface of the roller is communicatively coupled with the delivery port. The first lateral surface and the second lateral surface are isolated from the delivery port. An intersection of the circumferential surface of the roller and a virtual plane, passing through the axis, is a non-linear segment. The shaper is communicatively coupled with the scraper. The glutinous-substance source is coupled to the delivery port of the housing and comprises an enclosure to receive the glutinous substance. The system controller is configured to control delivery of the glutinous substance from the glutinous-substance source to the applicator.

BRIEF DESCRIPTION OF THE DRAWINGS

Figure 1:
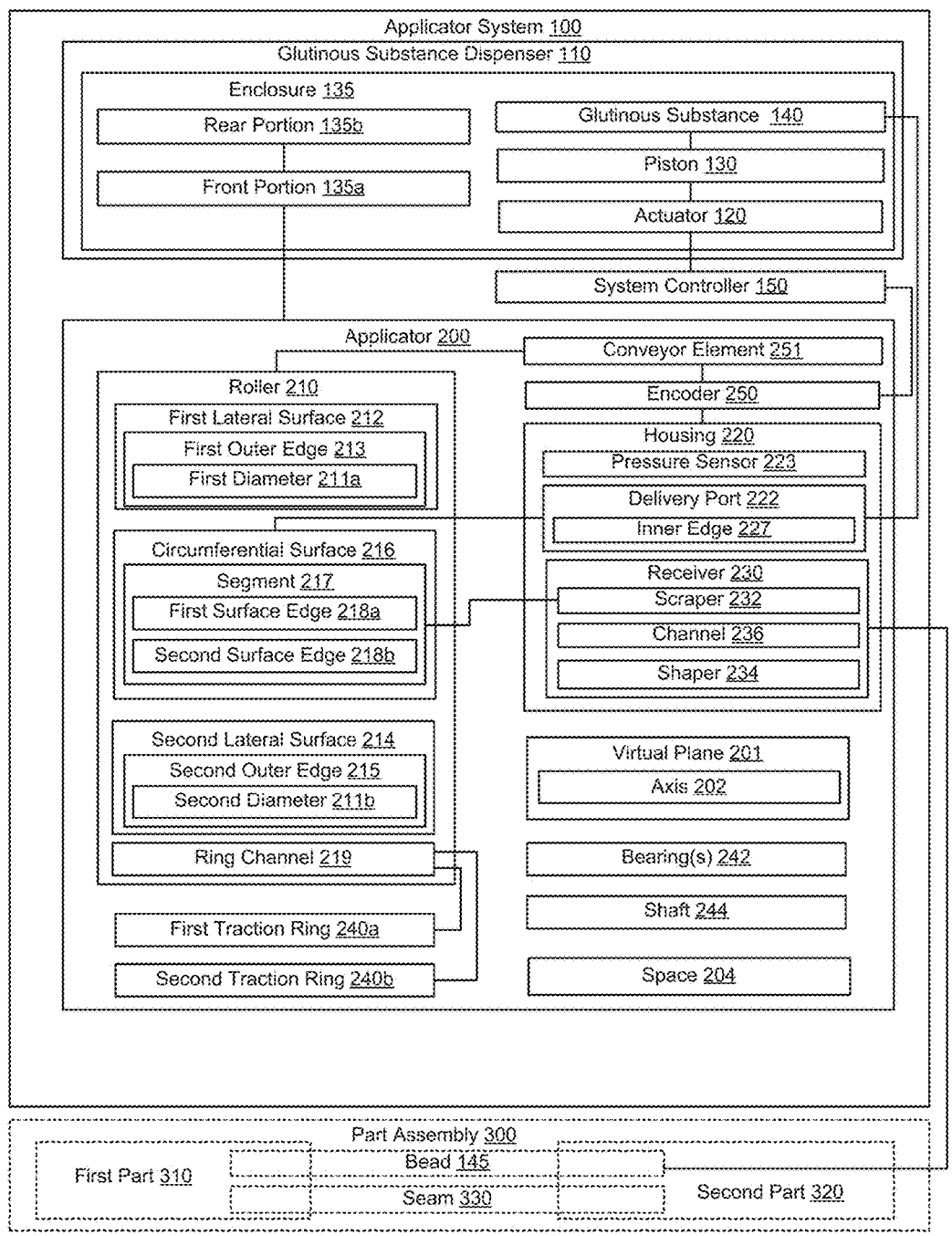
Figure 2C:
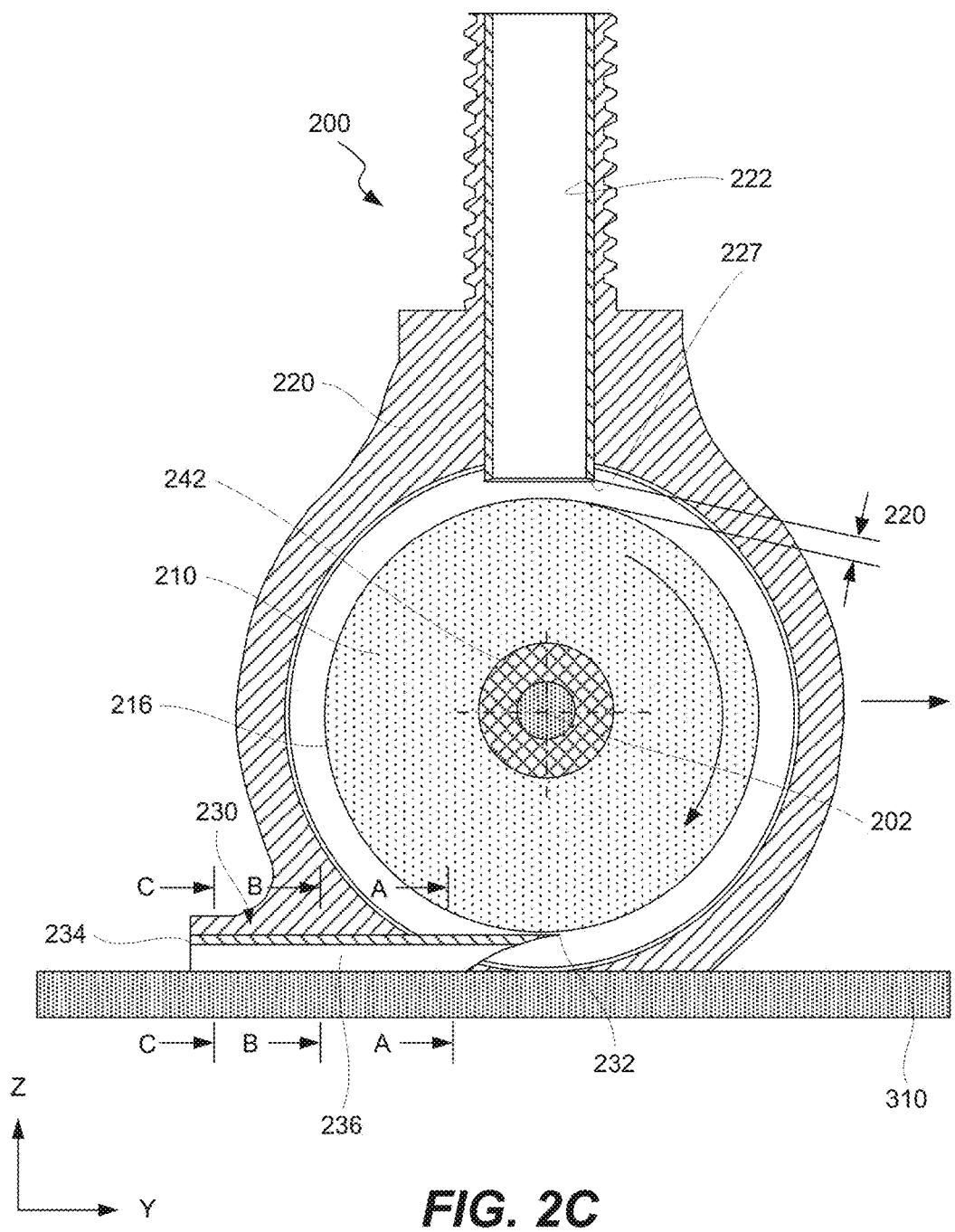
Figure 2D:
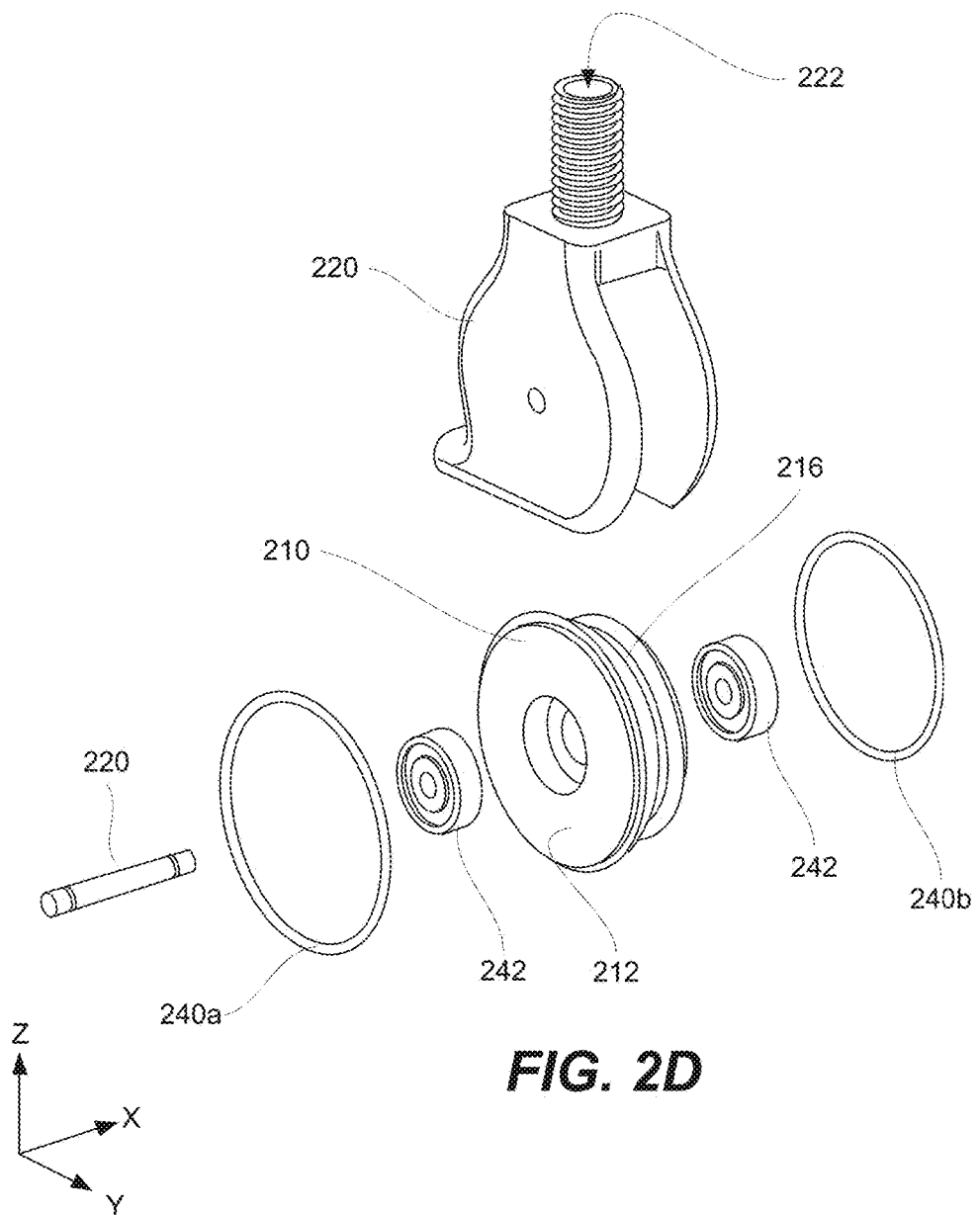
Figure 2E:
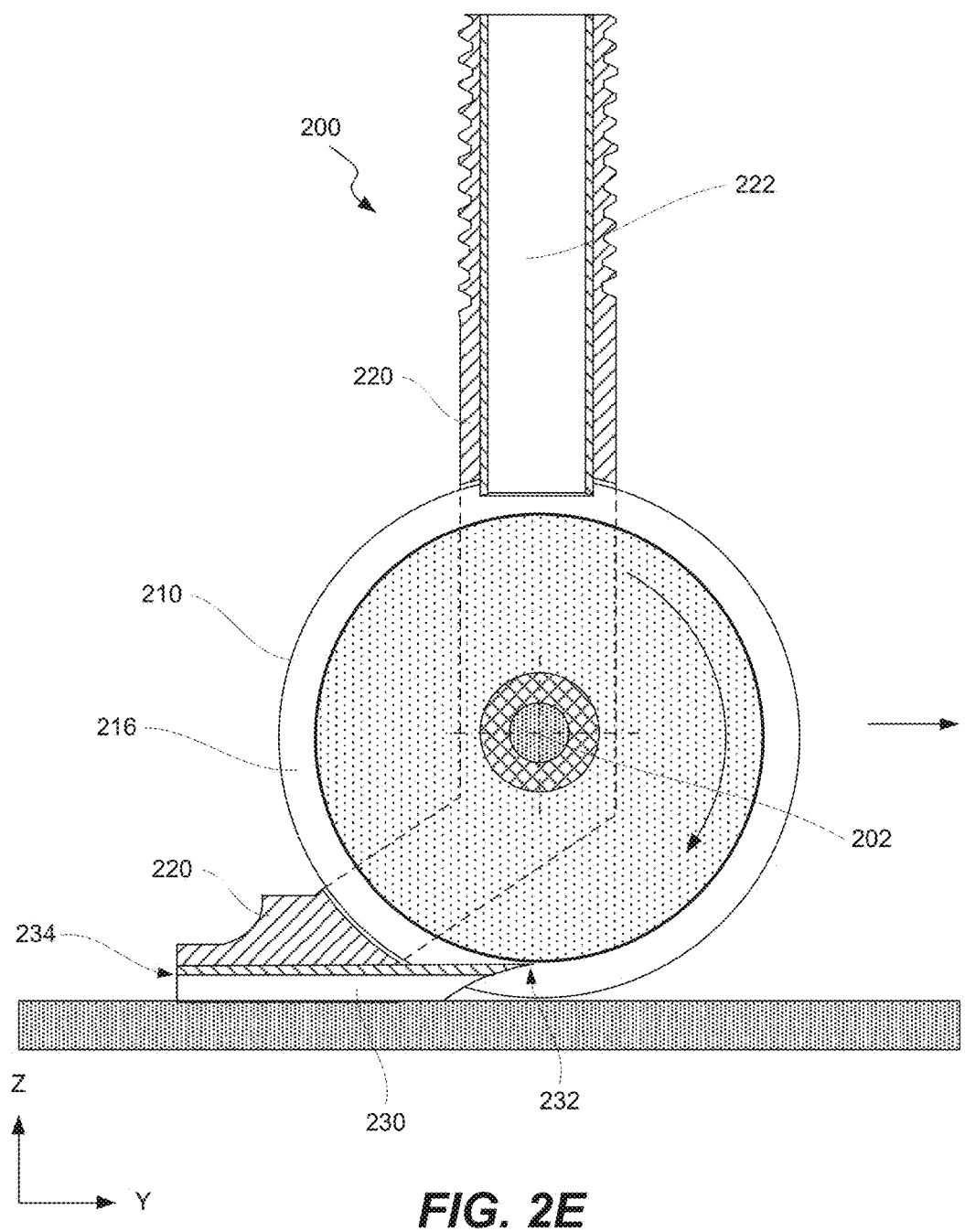
Figure 2F:
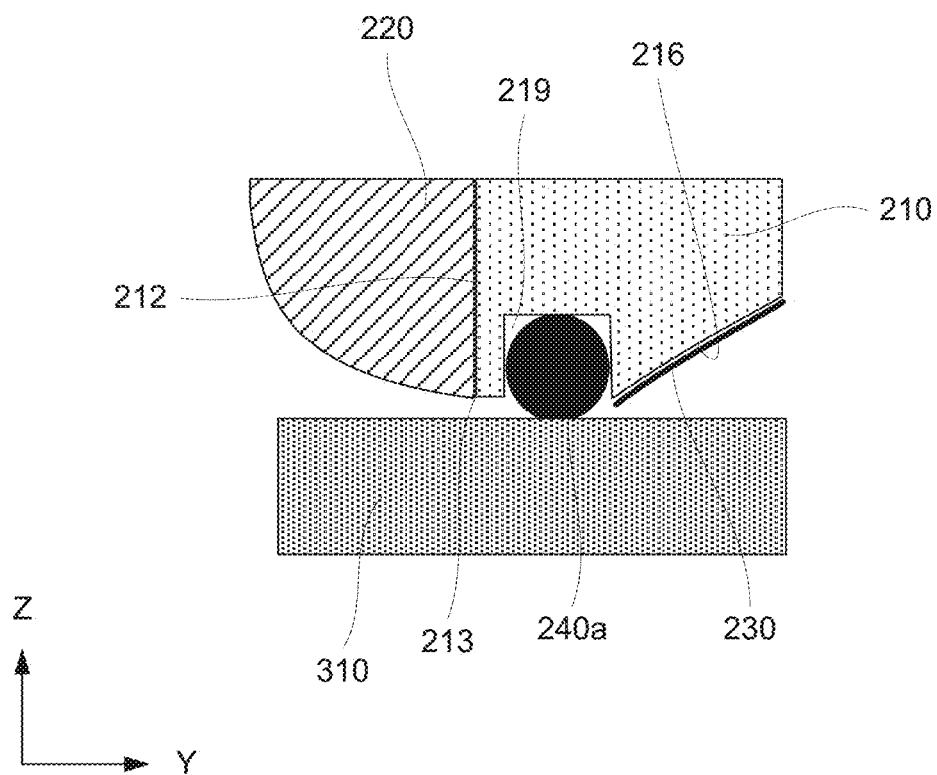
Figure 2G:
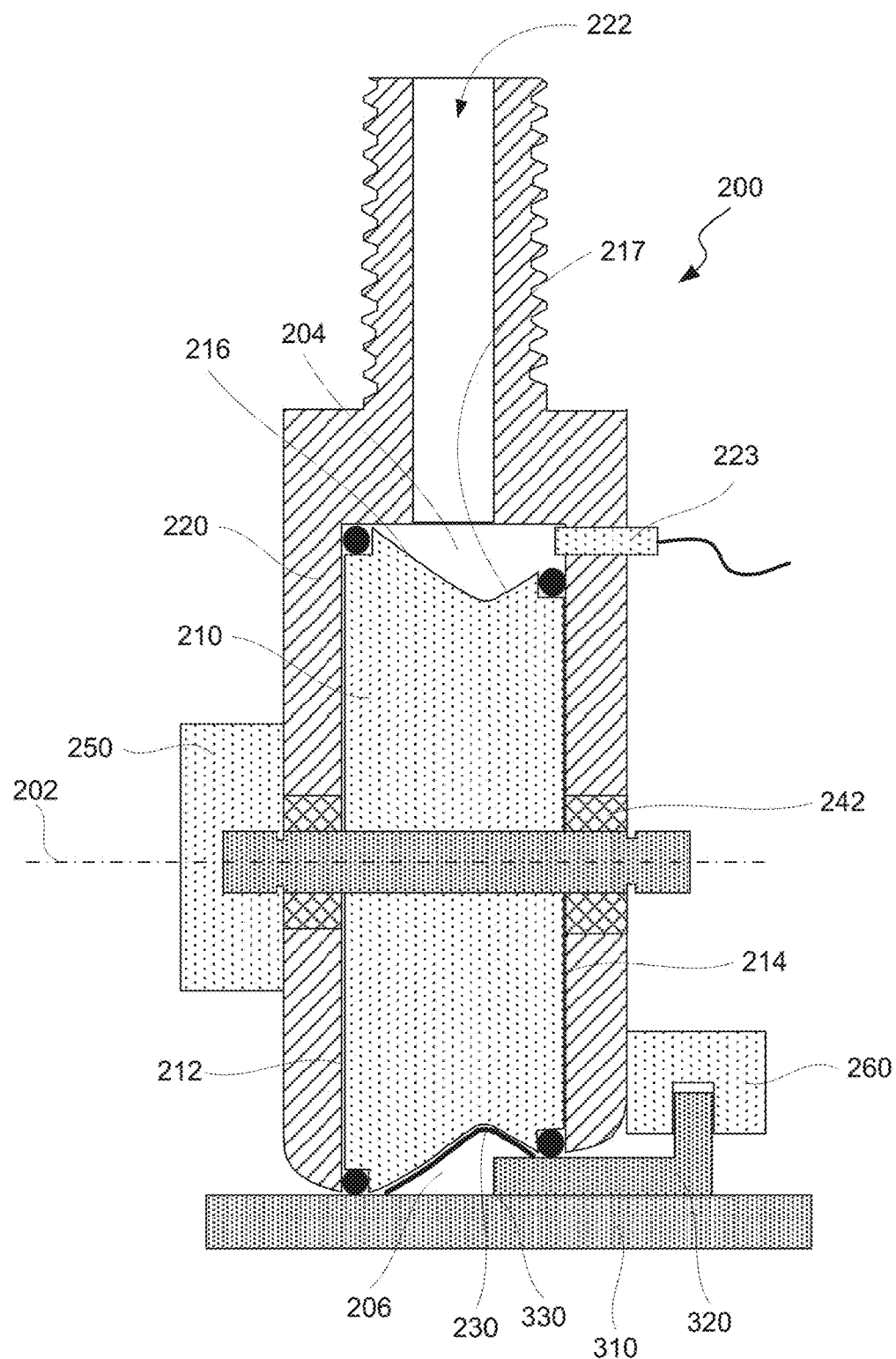
Figure 2I:
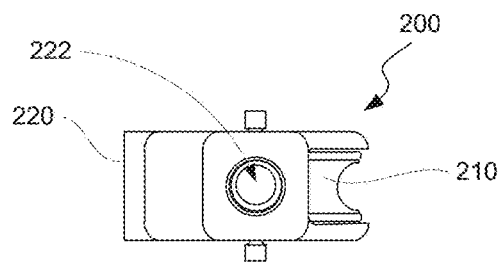
Figure 2K:
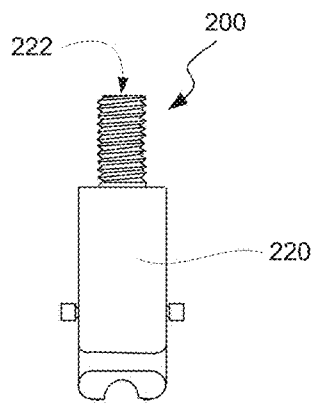
Figure 2H:
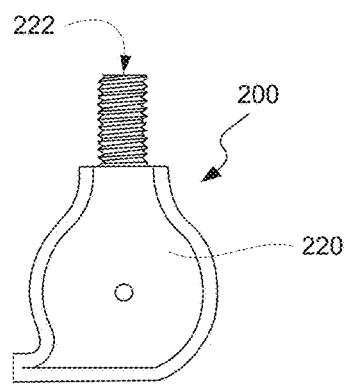
Figure 2L:
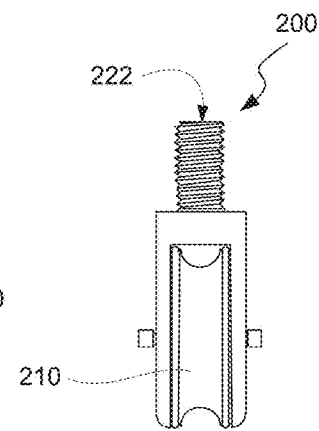
Figure 2J:
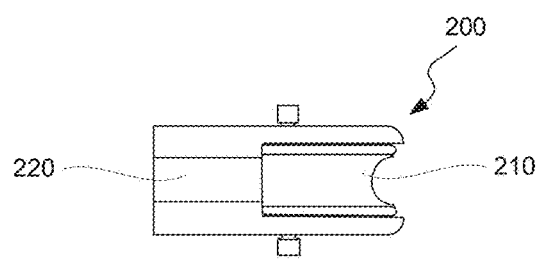
Figures 3A, 3B:
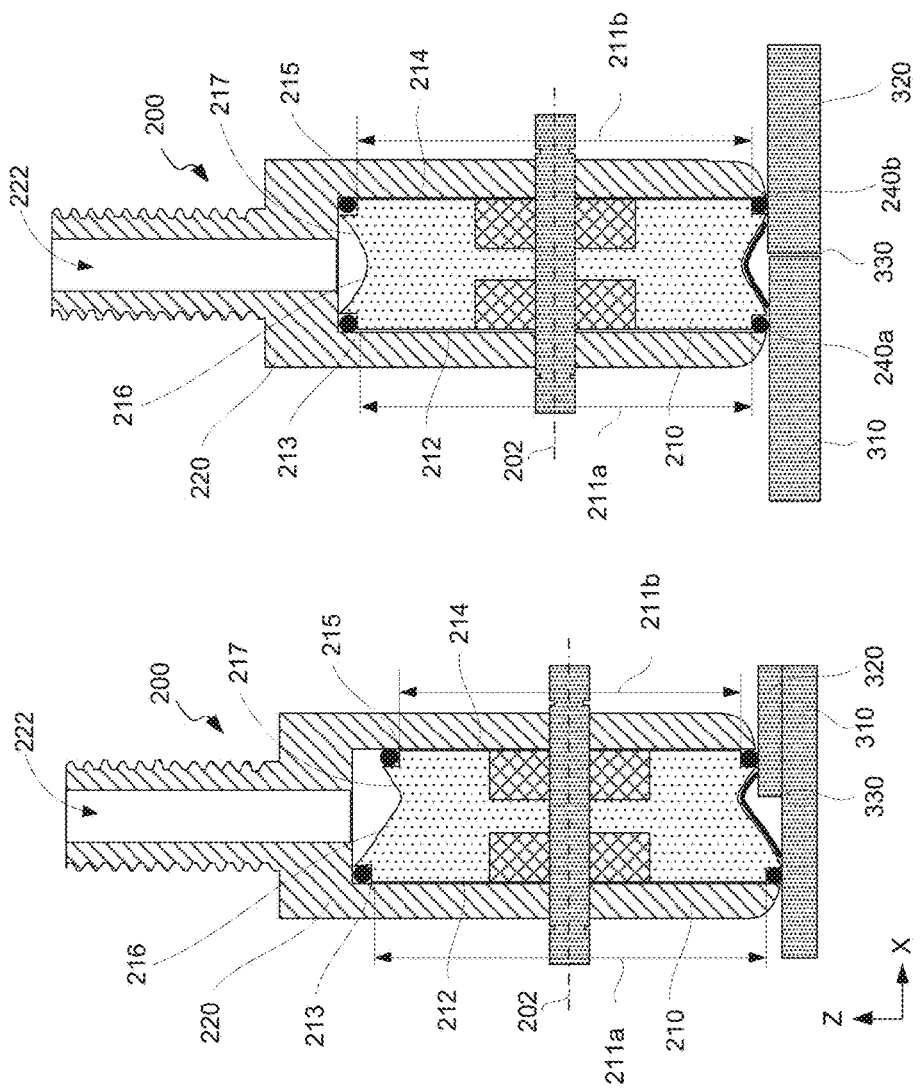
Figure 3C:
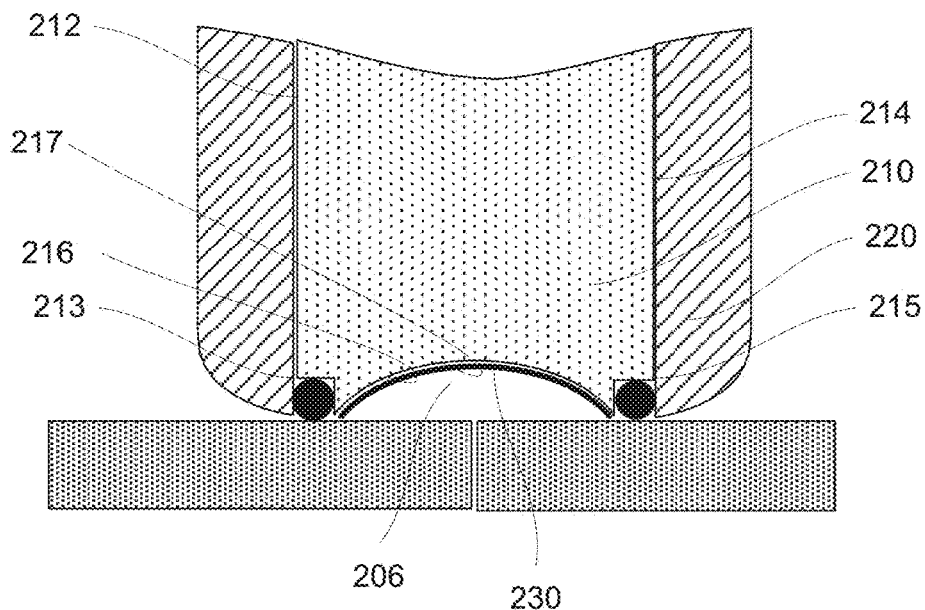
Figure 3D:
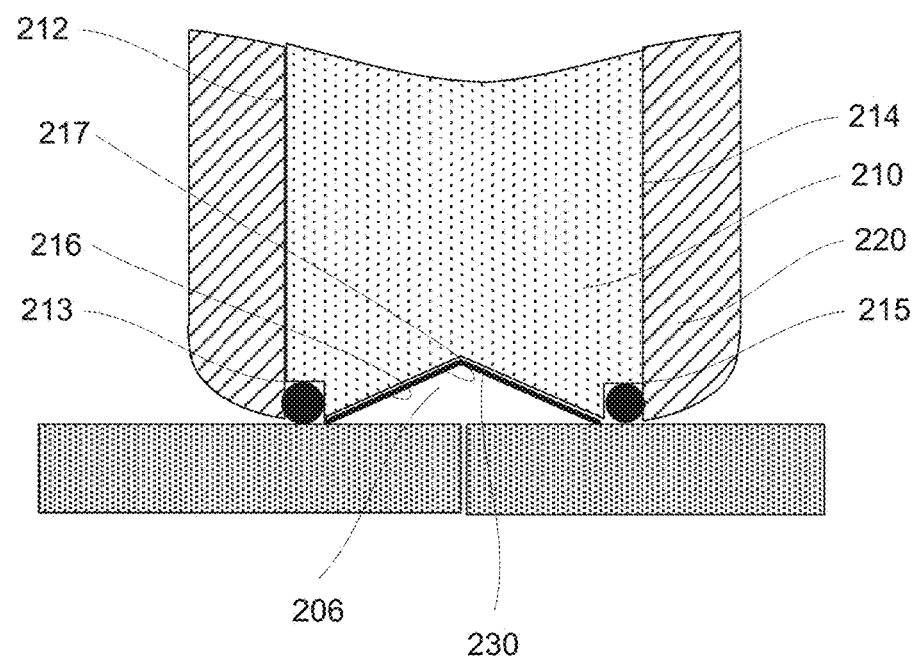
Figure 3E:
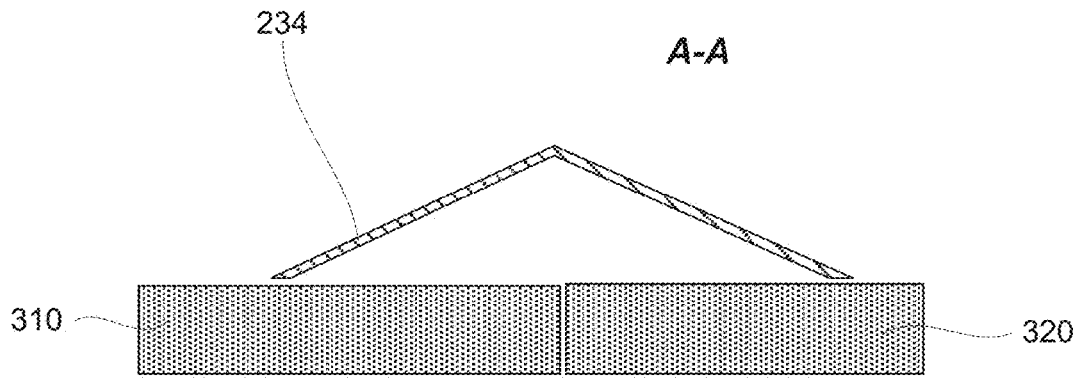
Figure 3F:
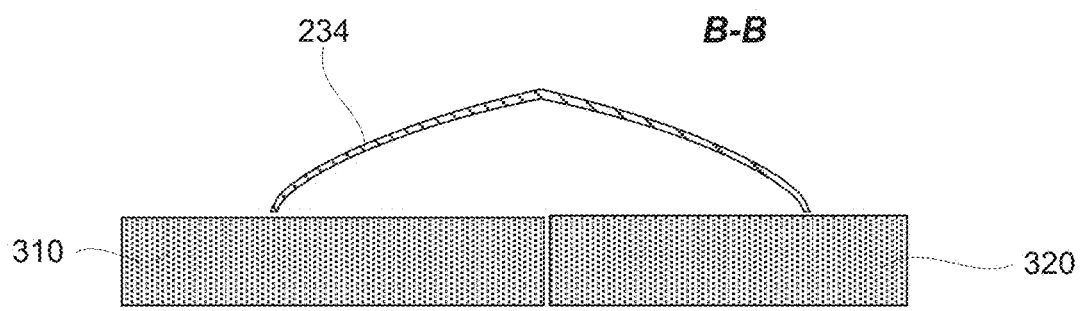
Figure 3G:
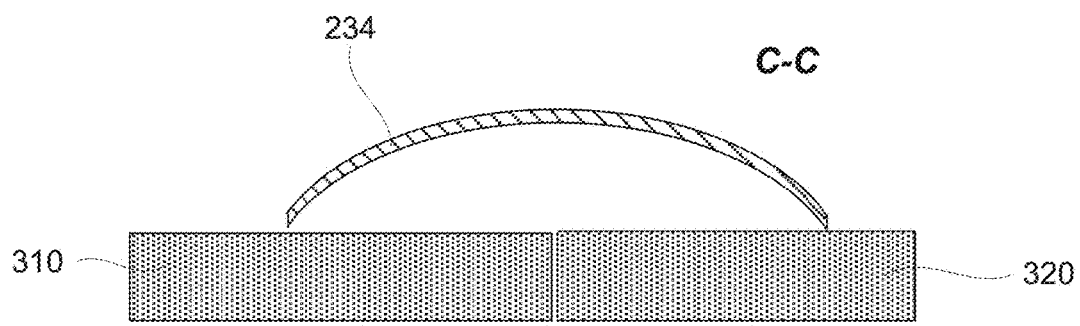
Figure 4A:
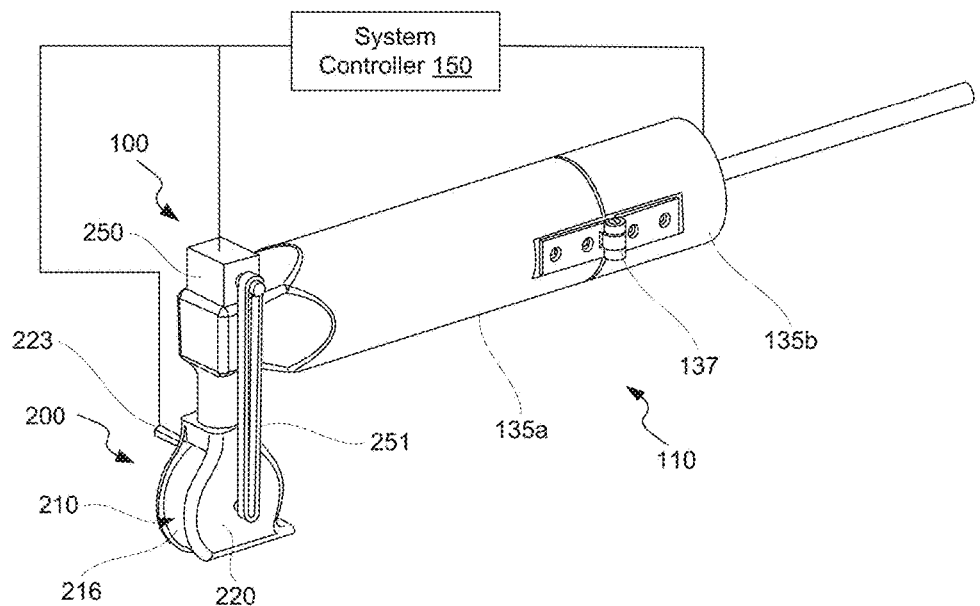
Figure 4B:
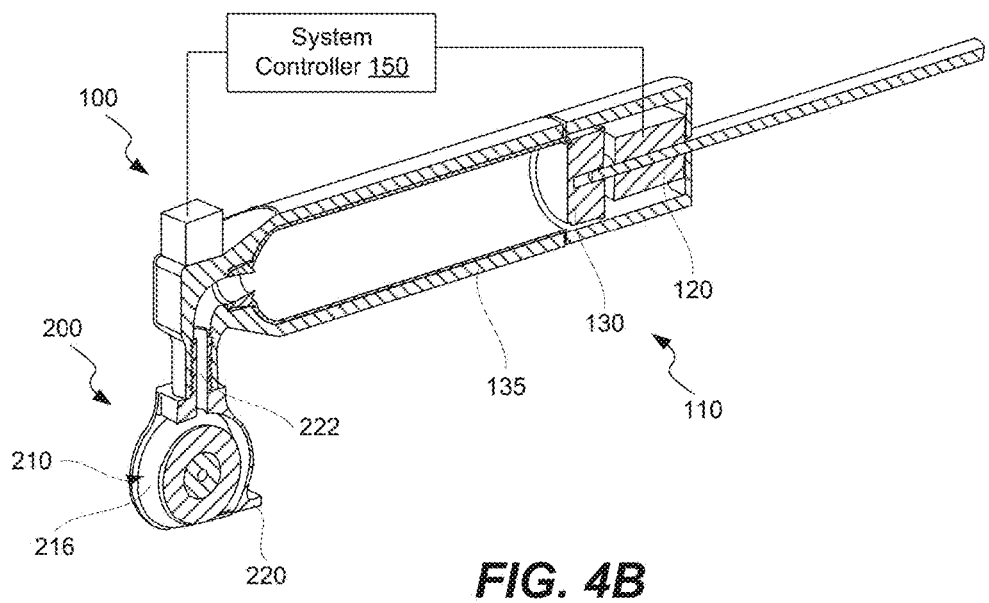
Figure 5:
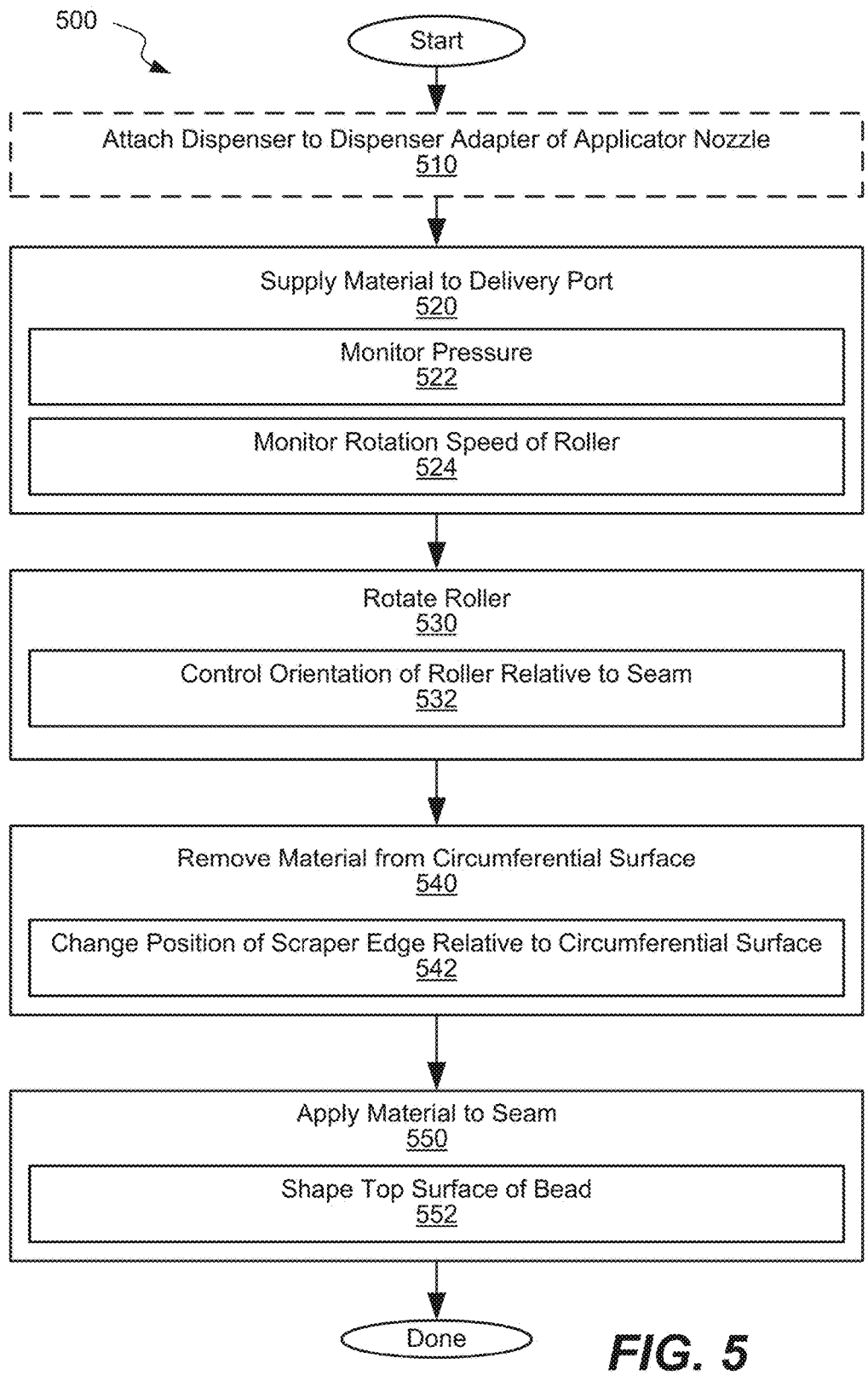
Figure 6A:
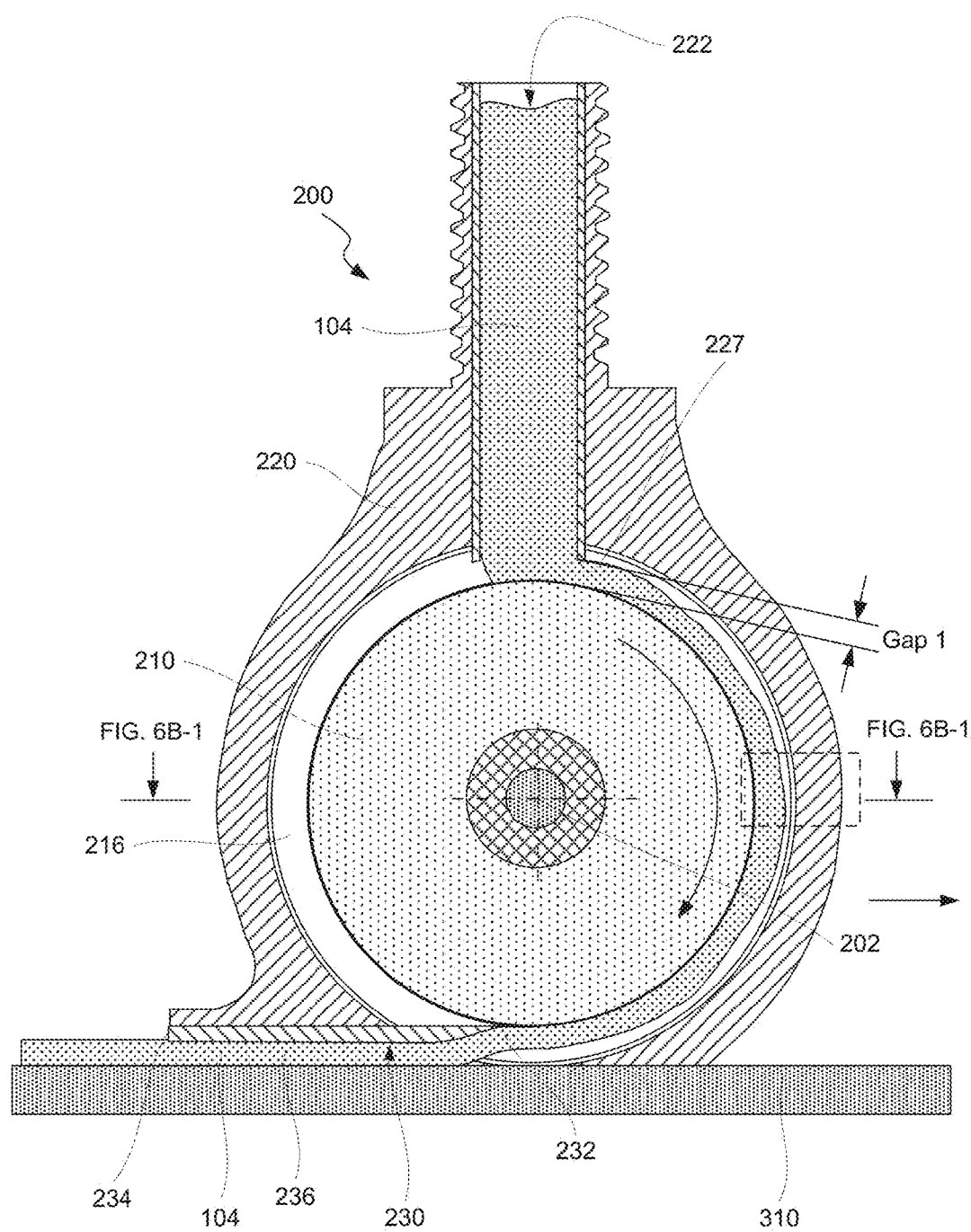
Figures 1, 6B:
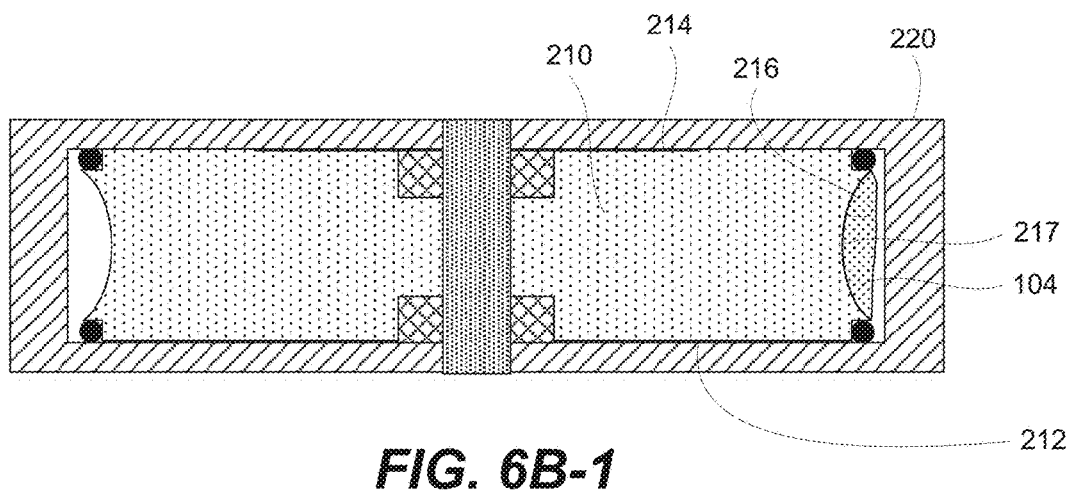
Figures 2, 6B:
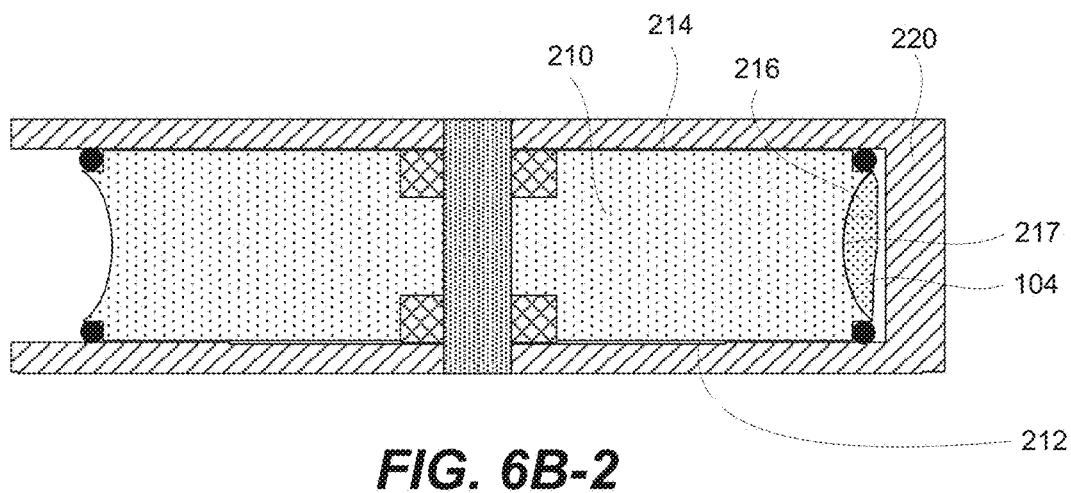
Figures 3, 6B:
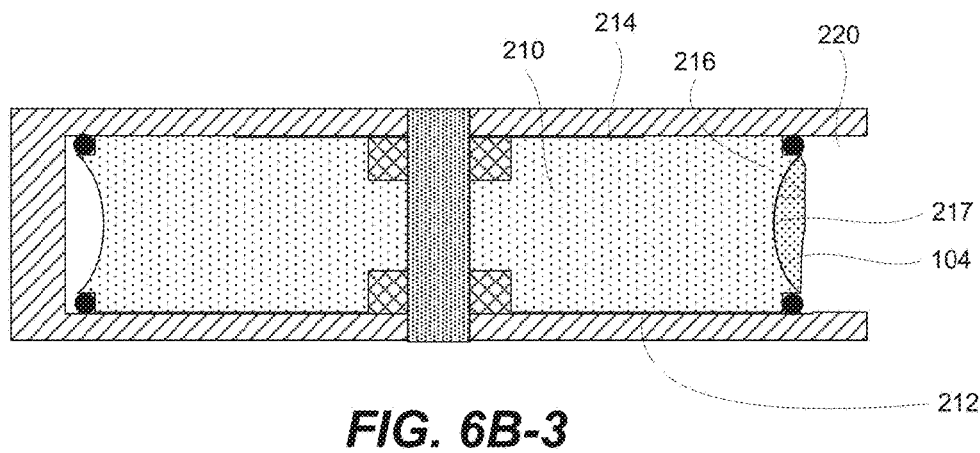
Figures 4, 6B:
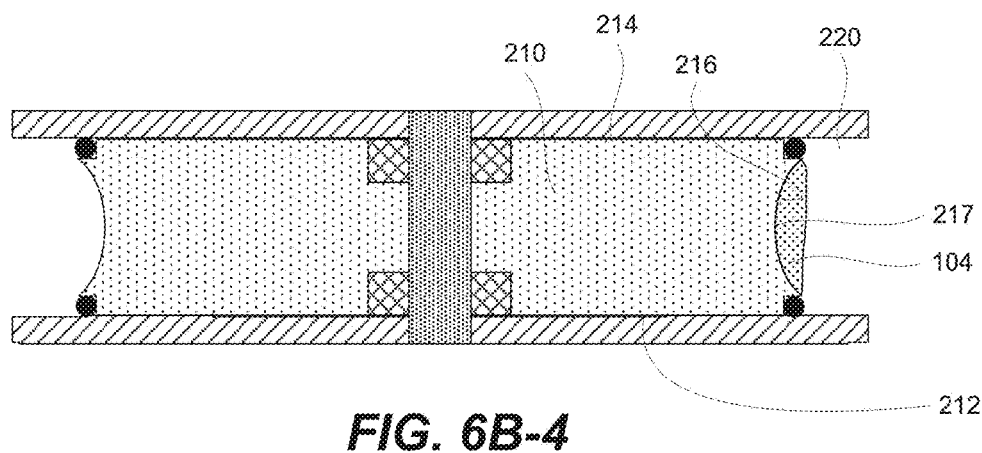
Figure 6C:
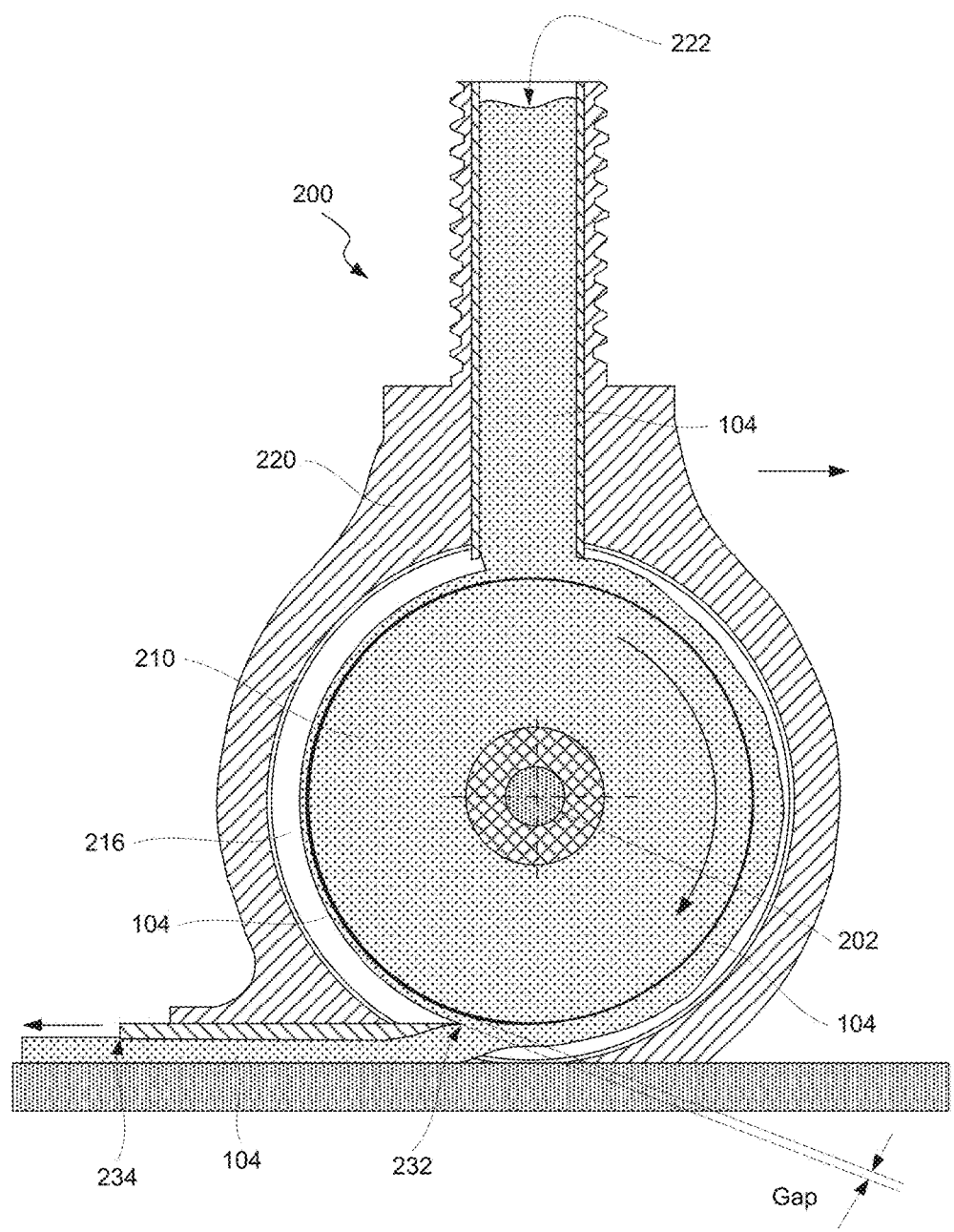
Figure 6D:
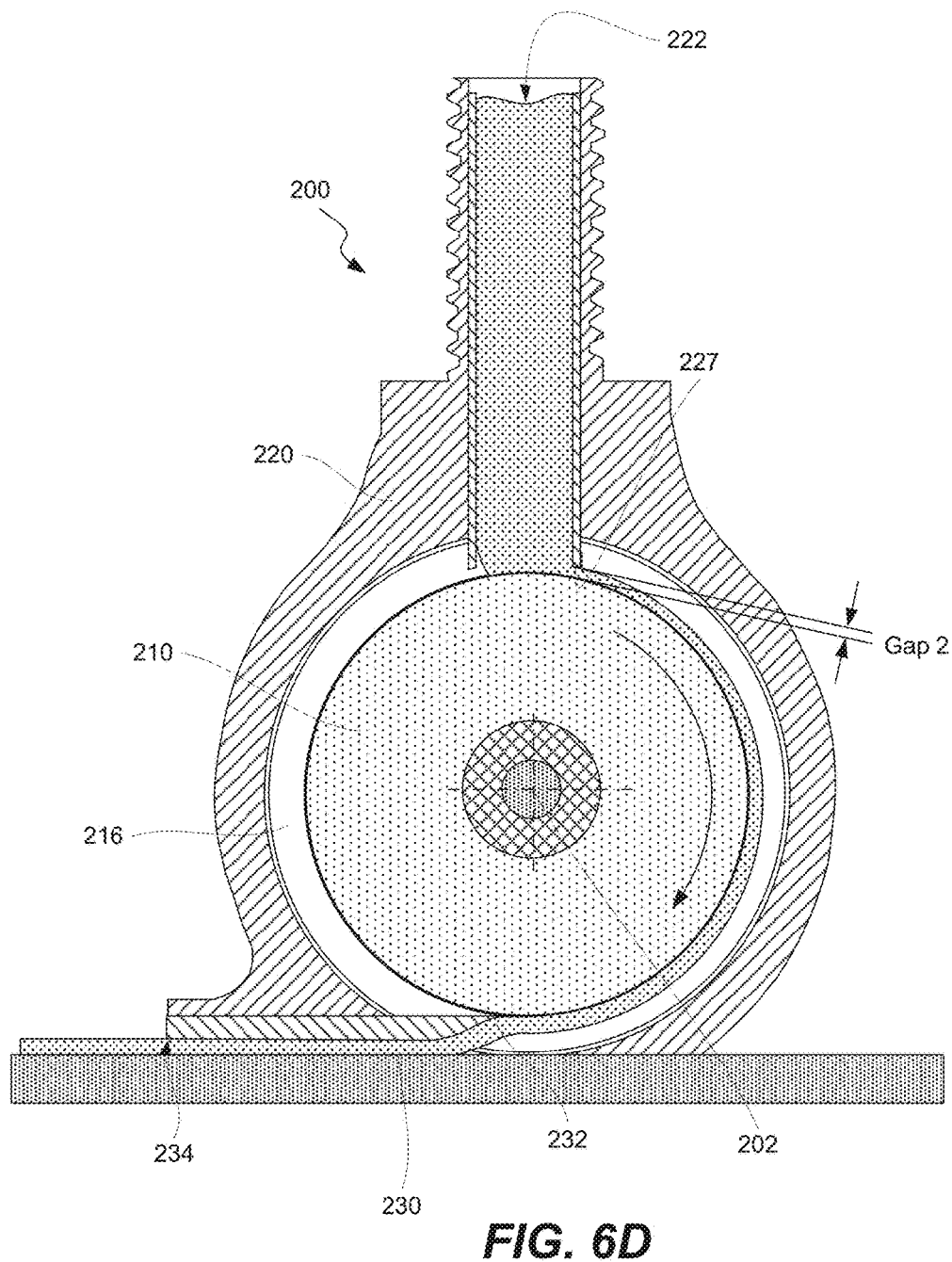
Figure 6E:
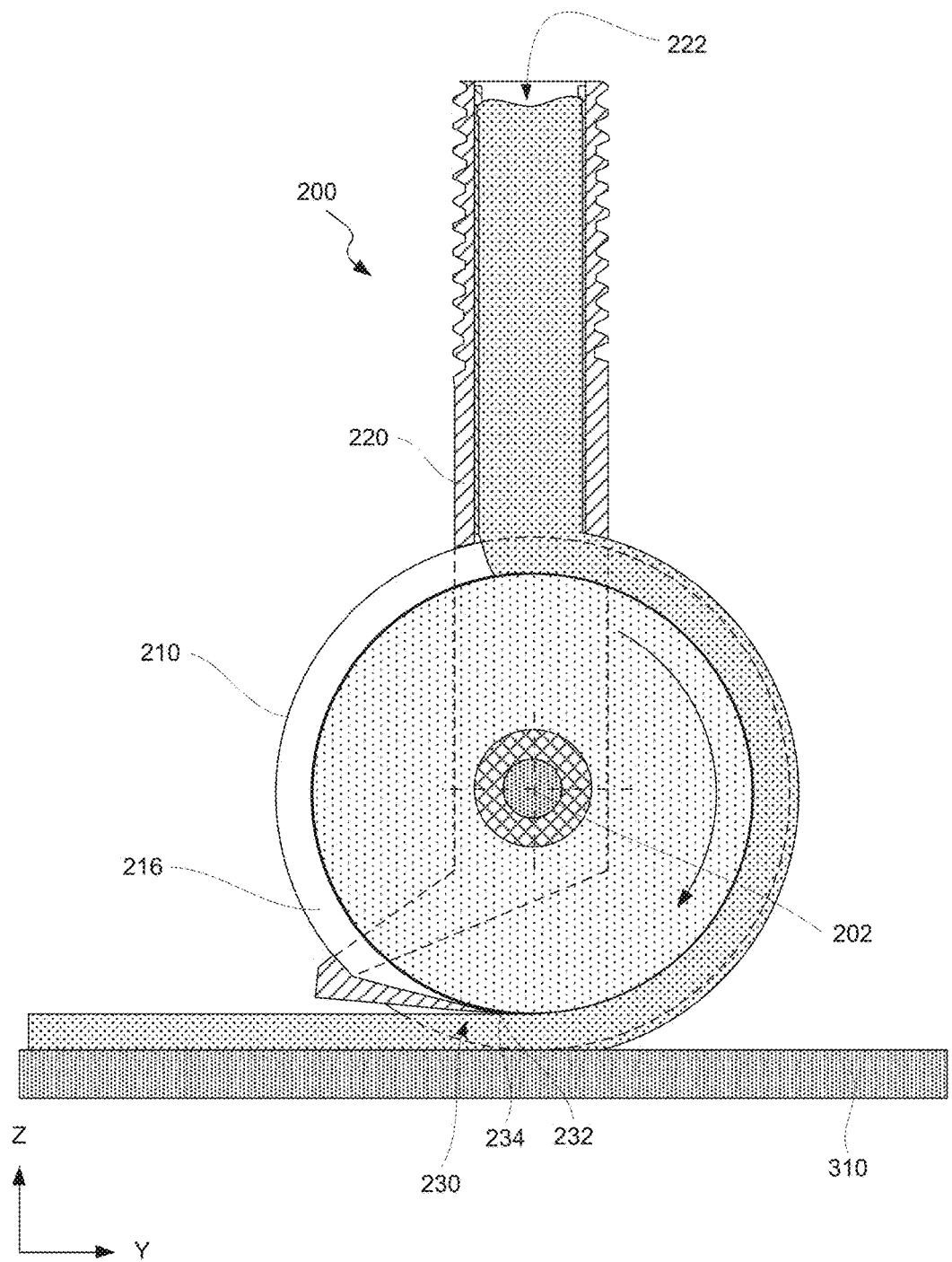
Figure 6F:
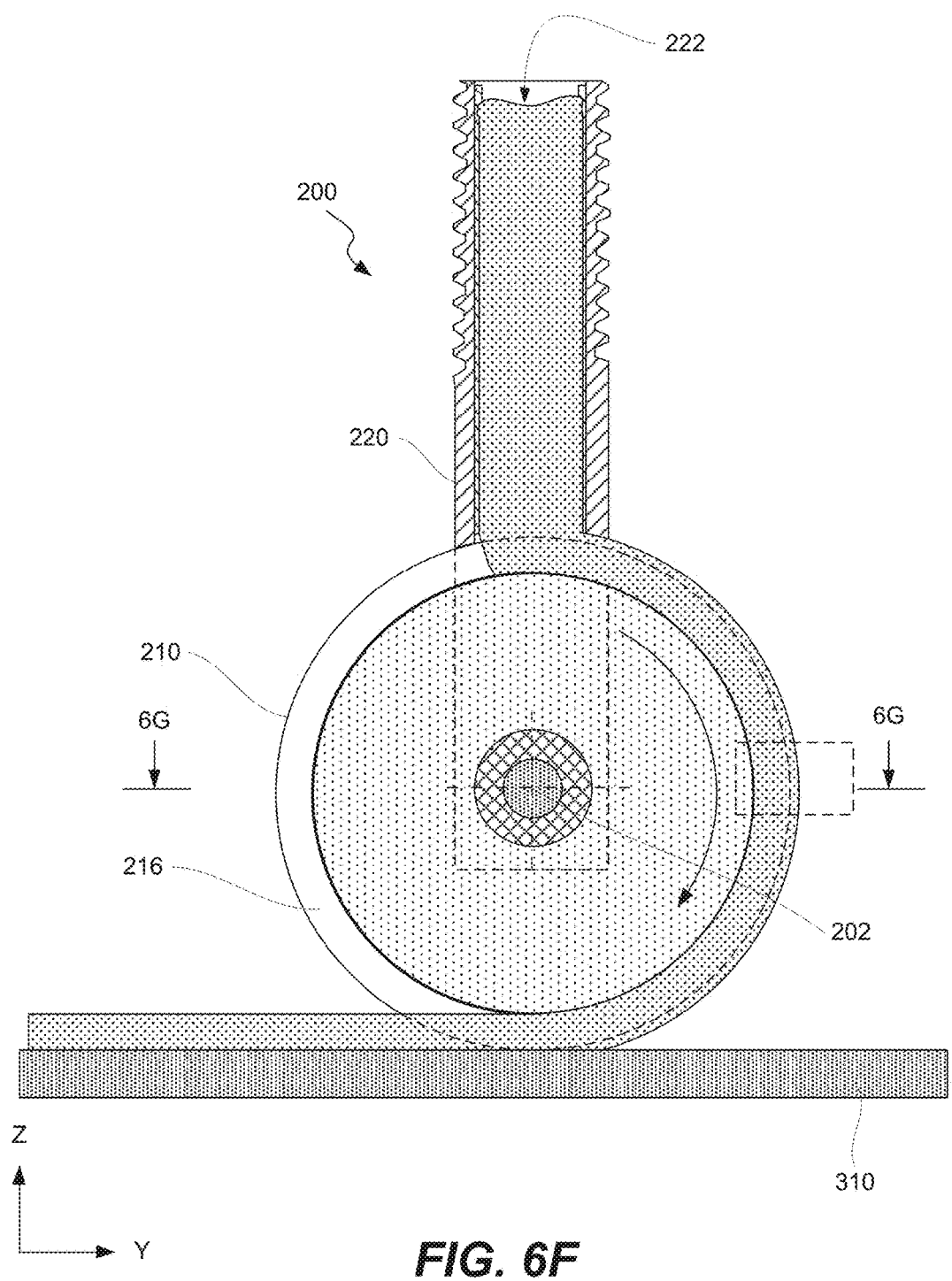
Figure 6G:
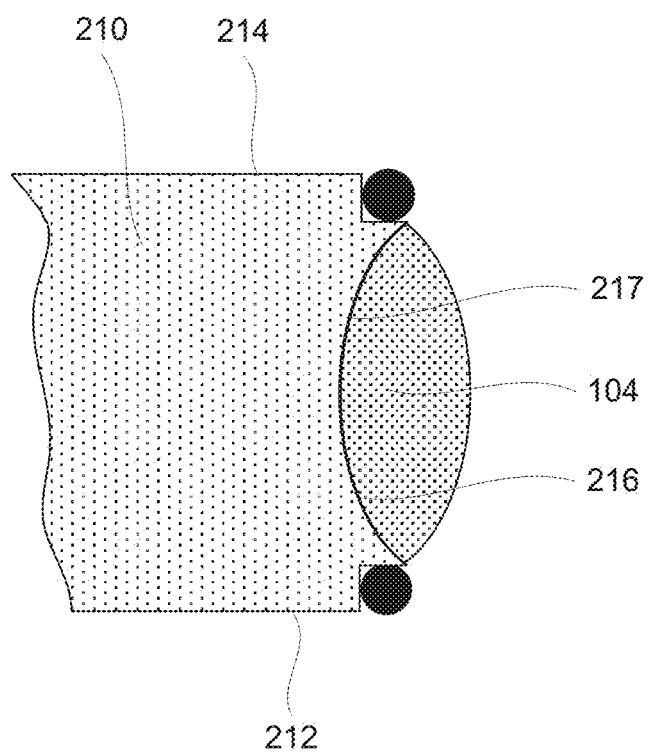
Figure 6H:
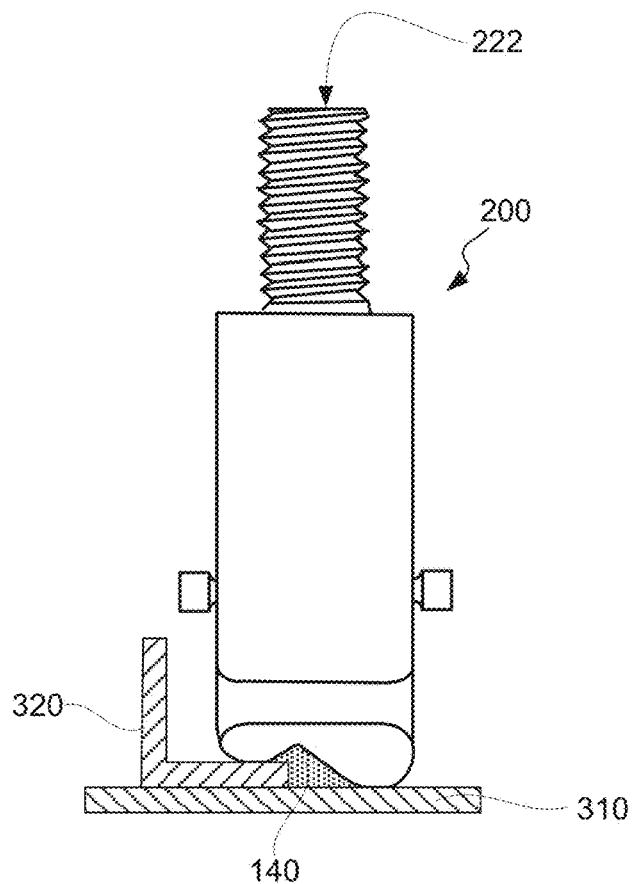
Figure 6I:
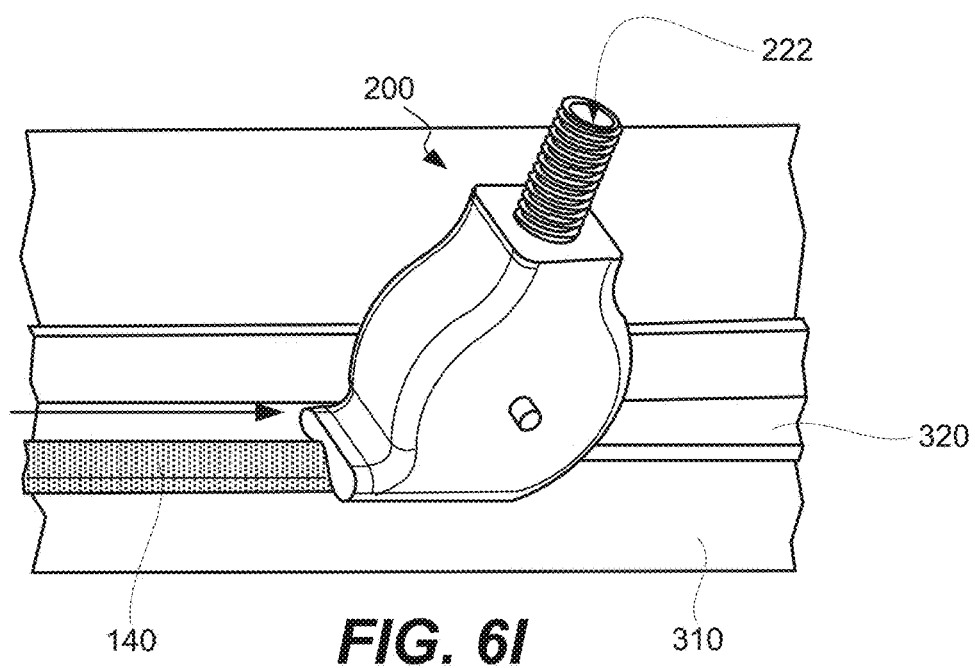
Figure 6J:
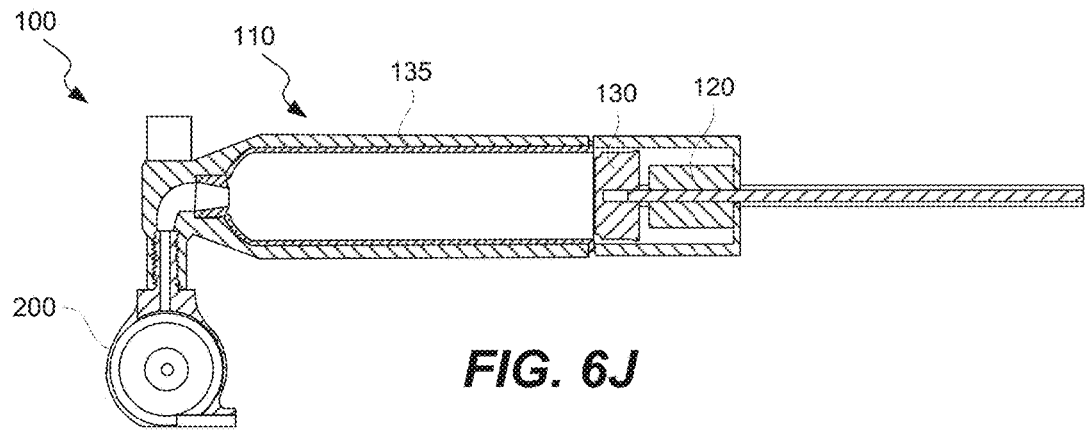
Figure 6K:
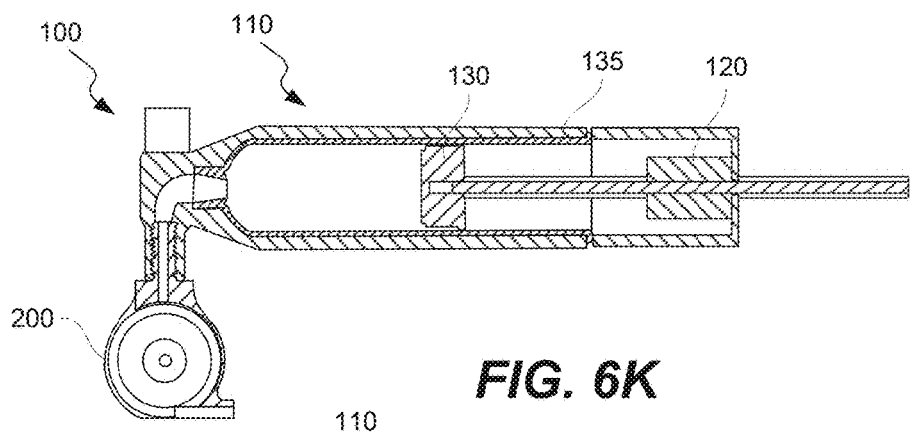
Figure 6L:
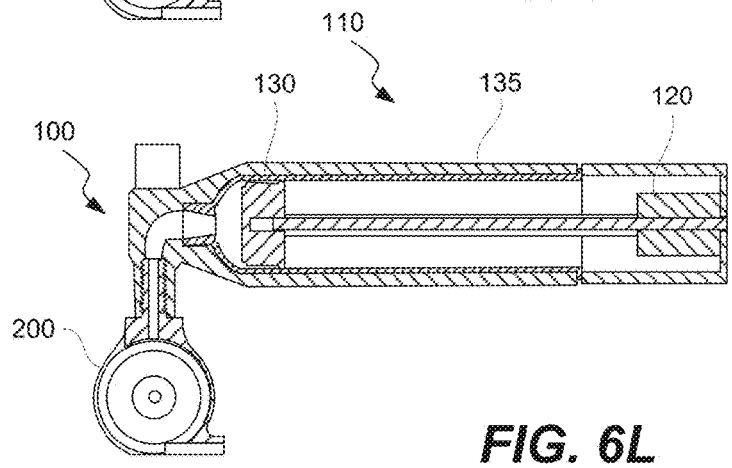
Figure 6M:
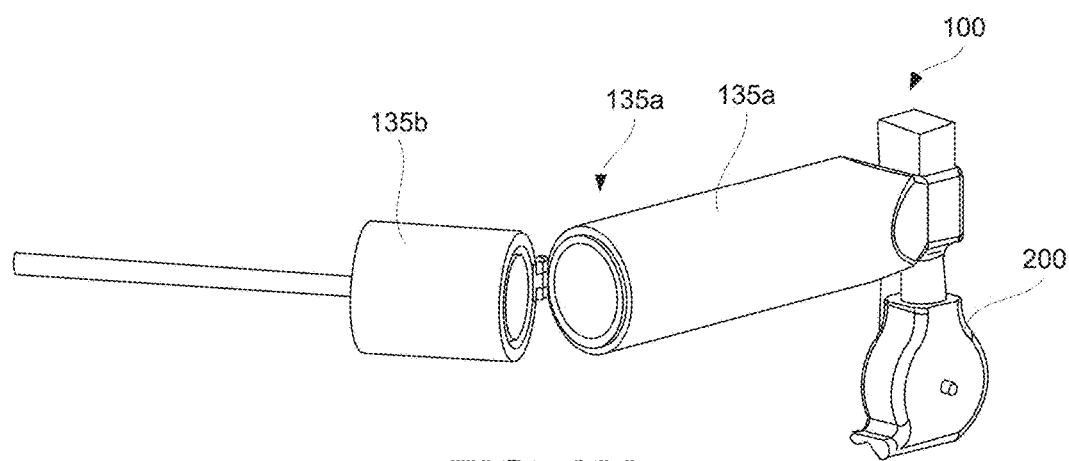
Figure 6N:
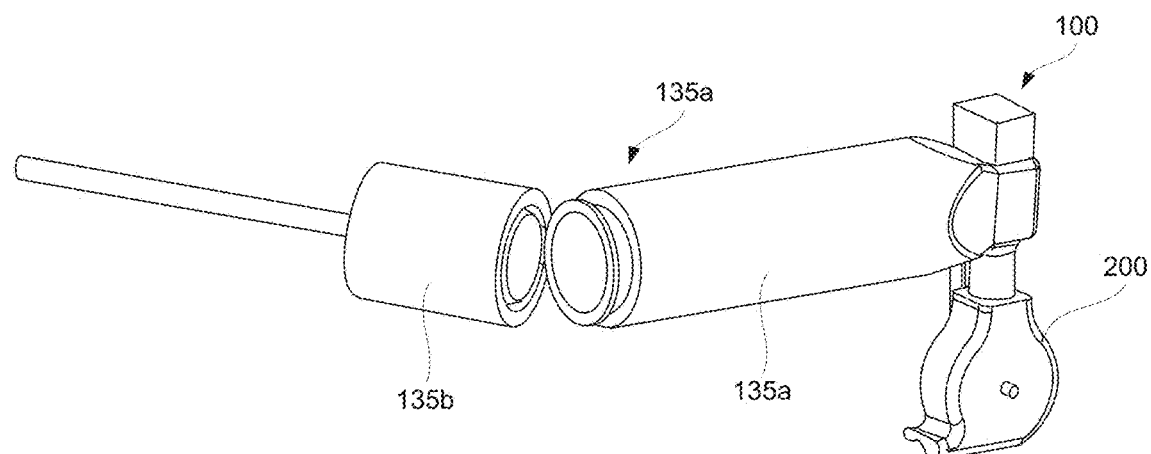
Figure 7:
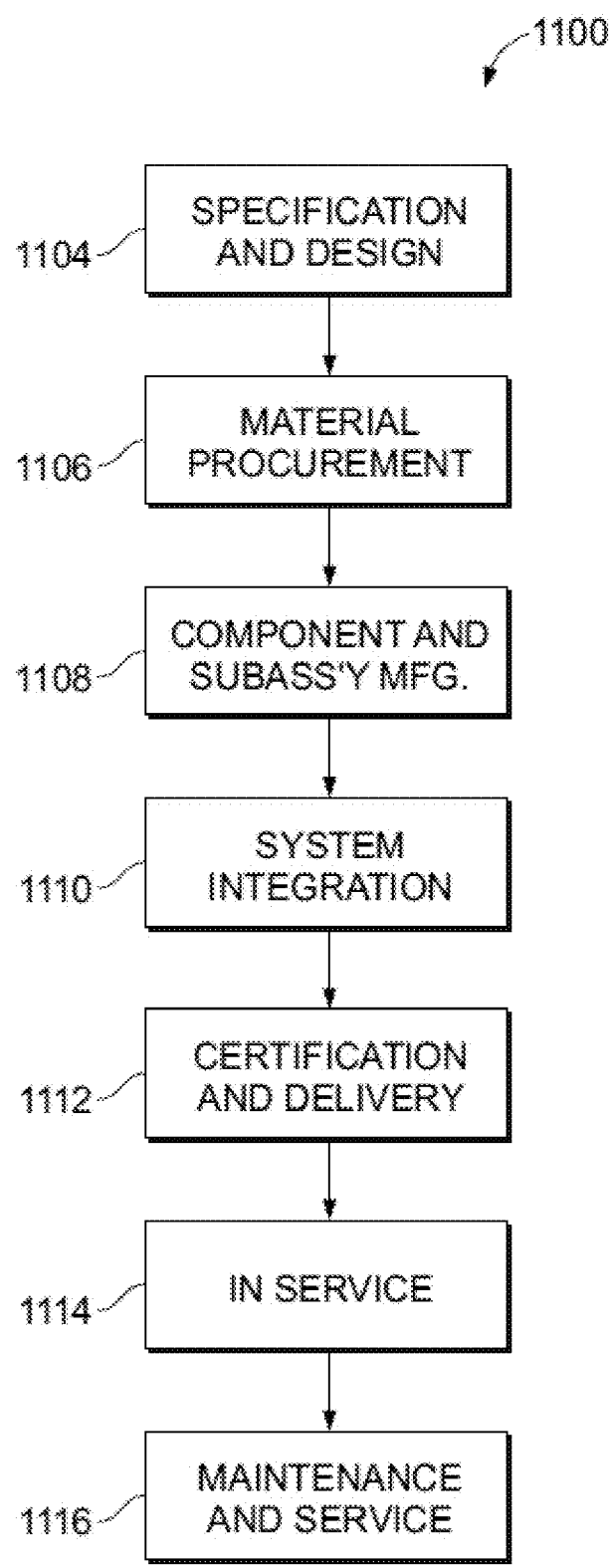
Figure 8:
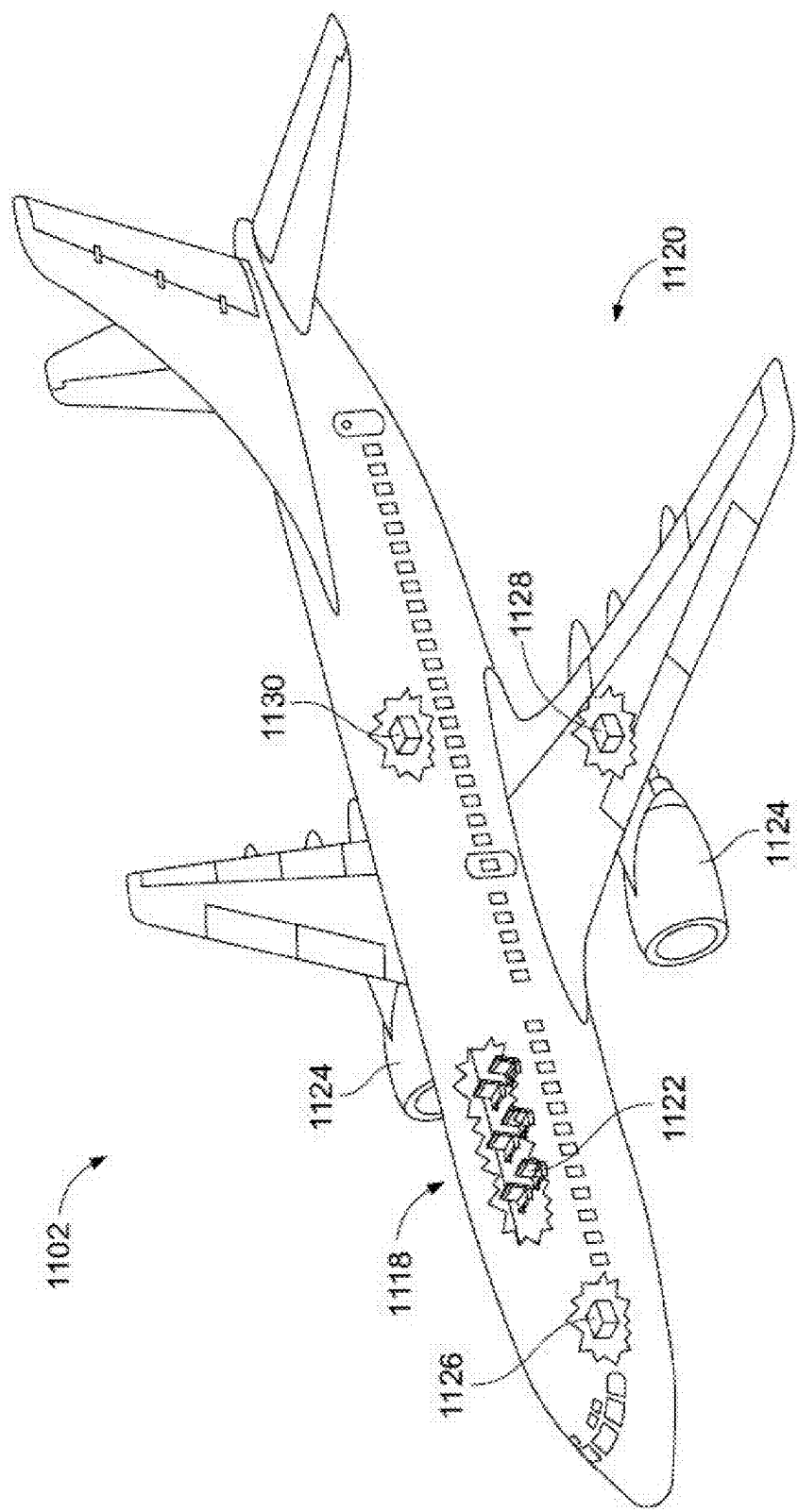

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of an applicator system comprising an applicator, according to one or more examples of the present disclosure;

FIG. 2A is a schematic, cross-sectional front view of the applicator of FIG. 1, positioned over a first part and a second part, according to one or more examples of the present disclosure;

FIGS. 2B-1 and 2B-2 are schematic, cross-sectional views of portions of the applicator of FIG. 1, illustrating the applicator interfacing with the first part and the second part, according to one or more examples of the present disclosure;

FIG. 2C is a schematic, cross-sectional side view of the applicator of FIG. 1, according to one or more examples of the present disclosure;

FIG. 2D is a schematic, exploded view of the applicator of FIG. 1, according to one or more examples of the present disclosure;

FIG. 2E is a schematic, cross-sectional side view of the applicator of FIG. 1, having a mostly exposed roller, according to one or more examples of the present disclosure;

FIG. 2F is a schematic, cross-sectional view of a portion of the applicator of FIG. 1, showing a traction ring positioned in a ring channel, according to one or more examples of the present disclosure;

FIG. 2G is a schematic, cross-sectional front view of the applicator of FIG. 1, comprising an encoder and a guide, according to one or more examples of the present disclosure;

FIGS. 2H-2L are different schematic views of the applicator of FIG. 1, according to one or more examples of the present disclosure;

FIGS. 3A and 3B are schematic, cross-sectional front views of the applicator of FIG. 1, positioned over different types of seams, according to one or more examples of the present disclosure;

FIGS. 3C and 3D are schematic, cross-sectional views of a portion of the applicator of FIG. 1 showing different profiles of a scraper, according to one or more examples of the present disclosure;

FIGS. 3E-3G are schematic, cross-sectional views of the same channel of the applicator's receiver, shown at a different cross-sectional location, according to one or more examples of the present disclosure;

FIG. 4A is a schematic, perspective view of the applicator system of FIG. 1, according to one or more examples of the present disclosure;

FIG. 4B is a schematic, cross-sectional, perspective view of the applicator system of FIG. 1, according to one or more examples of the present disclosure;

FIG. 5 is a process flowchart corresponding to a method of applying a glutinous substance to a seam between a first part and a second part using the applicator of FIG. 1, according to one or more examples of the present disclosure;

FIG. 6A is a schematic, cross-sectional side view of the applicator of FIG. 1, showing a path of the glutinous substance, according to one or more examples of the present disclosure;

FIGS. 6B-1 is a schematic, cross-sectional top view of a housing of applicator of FIG. 1, according to one or more examples of the present disclosure;

FIGS. 6B-2, 6B-3, and 6B-4 are schematic, cross-sectional top views of different examples of the housings shown in FIG. 6B-1, according to one or more examples of the present disclosure;

FIG. 6C is a schematic, cross-sectional side view of the applicator of FIG. 1, showing a scraper positioned away from the circumferential surface, according to one or more examples of the present disclosure;

FIG. 6D is a schematic, cross-sectional side view of the applicator of FIG. 1, showing a gap between the inner edge of a delivery port and the circumferential surface, according to one or more examples of the present disclosure;

FIG. 6E is a schematic, cross-sectional side view of the applicator of FIG. 1, showing a scraper being coincident with a shaper, according to one or more examples of the present disclosure;

FIG. 6F is a schematic, cross-sectional side view of the applicator of FIG. 1 without a scraper, according to one or more examples of the present disclosure;

FIG. 6G is a schematic, cross-sectional top view of a portion of the roller, according to one or more examples of the present disclosure;

FIGS. 6H and 6I are two schematic views of the applicator of FIG. 1 forming a bead of glutinous substance over a seam between a first part and a second part, according to one or more examples of the present disclosure;

FIGS. 6J-6L are schematic, cross-sectional, side view of the applicator system of FIG. 1, showing different positions of the piston within the enclosure, according to one or more examples of the present disclosure;

FIGS. 6M-6N are schematic, perspective view of the applicator system of FIG. 1, showing the rear portion of the enclosure pivoting relative to the front portion, according to one or more examples of the present disclosure;

FIG. 7 is a block diagram of aircraft production and service methodology; and FIG. 8 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 7 and 8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 7 and 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIG. 2A, applicator 200, for applying glutinous substance 140 to seam 330 between first part 310 and second part 320, is disclosed. Applicator 200 comprises roller 210. Roller 210 comprises first lateral surface 212, second lateral surface 214 opposite of first lateral surface 212, and circumferential surface 216, separating first lateral surface 212 and second lateral surface 214. Applicator 200 further comprises housing 220, comprising delivery port 222, scraper 232, and shaper 234. Roller 210 is coupled to housing 220 and is rotatable relative to housing 220 about axis 202. Housing 220 at least partially encloses circumferential surface 216 of roller 210. Circumferential surface 216 of roller 210 is communicatively coupled with delivery port 222. First lateral surface 212 and second lateral surface 214 are isolated from delivery port 222. An intersection of circumferential surface 216 of roller 210 and a virtual plane, passing through axis 202, is non-linear segment 217. Scraper 232 is geometrically complementary at least with non-linear segment of circumferential surface 216 of roller 210. Shaper 234 is communicatively coupled with the scraper. The preceding subject matter of this paragraph characterizes example 1 of the present disclosure.

Applicator 200 is designed to deliver specific amounts of glutinous substance 140 to seam 330 using roller 210. Glutinous substance 140 is supplied through delivery port 222 to circumferential surface 216. Glutinous substance 140 is then carried on circumferential surface 216 from delivery port 222 to scraper 232 while roller 210 is rotated relative to housing 220. As a part of this rotation, roller 210 is rolled over first part 310 and second part 320. As such, the rotational speed of roller 210 is proportional to the linear speed with which roller 210 (and applicator 200) moves relative to first part 310 and second part 320 and delivers glutinous substance 140 to seam 330. Scraper 232, being geometrically complementary with non-linear segment 217 of circumferential surface 216, removes at least a portion of glutinous substance 140 from circumferential surface 216 and directs glutinous substance 140 to seam 330 as applicator 200 moves along seam 330. The position of scraper 232 relative to circumferential surface 216 may be used for controlling the amount of glutinous substance 140 transferred from circumferential surface 216 to seam 330.

Roller 210 of applicator 200 is used to deliver glutinous substance 140 and also to control the amount of glutinous substance 140 delivered to seam 330. Only the amount of glutinous substance 140 carried by roller 210 can be transferred to seam 330. In some examples, the entire amount of glutinous substance 140 carried by roller 210 is transferred to seam 330. Alternatively, only a portion of this entire amount of glutinous substance 140 is transferred to seam 330. The remaining portion of glutinous substance 140 is carried back to delivery port 222.

The transferred amount may depend on the position of scraper 232 relative to circumferential surface 216. For example, if scraper 232 contacts or substantially contacts circumferential surface 216, such that no glutinous substance 140 can pass between scraper 232 and circumferential surface 216, then the entire amount of glutinous substance 140 carried on circumferential surface 216 is transferred to seam 330. As noted above, scraper 232 is geometrically complementary at least with non-linear segment 217 of circumferential surface 216 of roller 210. Alternatively, if scraper 232 is spaced apart from circumferential surface 216, such that some amount of glutinous substance 140 can pass between scraper 232 and circumferential surface 216, then this amount of glutinous substance 140 (which passes between scraper 232 and circumferential surface 216) may not be transferred to seam 330. Instead, this amount remains on circumferential surface 216 and carried past scraper 232 to delivery port 222.

Glutinous substance 140 is delivered through delivery port 222 and transferred to circumferential surface 216, which is communicatively coupled with delivery port 222. First lateral surface 212 and second lateral surface 214 remain free from glutinous substance 140. The amount of glutinous substance 140 transferred from delivery port 222 to circumferential surface 216 may be also controlled by various design aspects of delivery port 222 and circumferential surface 216.

Referring generally to FIG. 1 and particularly to, e.g., FIGS. 2A, 2B-1, 2B-2, and 3A first lateral surface 212 comprises first outer edge 213, having first diameter 211$a$. Second lateral surface 214 comprises second outer edge 215, having second diameter 211$b$. First diameter 211$a$ is different from second diameter 211$b$. The preceding subject matter of this paragraph characterizes example 2 of the present disclosure, wherein example 2 also includes the subject matter according to example 1, above.

During operation of applicator 200, roller 210 is rolled over first part 310 and second part 320. Specifically, first lateral surface 212 is positioned over first part 310, while second lateral surface 214 is positioned over second part 320. In some examples, first part 310 and second part 320 may not be co-planar. At the same time, it may be desirable to maintain applicator 200 substantially perpendicular to the top surfaces of first part 310 and second part 320. To maintain this orientation (when first part 310 and second part 320 are non-planar), first outer edge 213 of first lateral surface 212 and second outer edge 215 of second lateral surface 214 may have different diameters.

As shown in FIGS. 2A and 3A, second part 320 is positioned above first part 310. In this example, first diameter 211$a$ of first outer edge 213 of first lateral surface 212 may be smaller than second diameter 211$b$ of second outer edge 215 of second lateral surface 214. More specifically, the difference between first diameter 211$a$ and second diameter 211$b$ may be equal to the offset between second part 320 and first part 310. As a result of this difference in diameters, axis 202 remains substantially parallel to the top surfaces of first part 310 and second part 320 when first part 310 and second part 320 are not coplanar. One having ordinary skill in the art would understand that first part 310 and second part 320 may only be non-coplanar near and along seam 330 or, more specifically, at contact points of roller 210.

Referring generally to FIG. 1 and particularly to, e.g., FIG. 3B, first lateral surface 212 comprises first outer edge 213, having first diameter 211$a$. Second lateral surface 214 comprises second outer edge 215, having second diameter 211$b$. First diameter 211$a$ is identical to second diameter 211b. The preceding subject matter of this paragraph characterizes example 3 of the present disclosure, wherein example 3 also includes the subject matter according to example 1, above.

During operation of applicator 200, roller 210 is rolled over first part 310 and second part 320. Specifically, first lateral surface 212 is positioned over first part 310, while second lateral surface 214 is positioned over second part 320. First part 310 and second part 320 may be co-planar as, for example, shown in FIG. 3B. To maintain applicator 200 substantially perpendicular to the top surfaces of first part 310 and second part 320, first outer edge 213 of first lateral surface 212 and second outer edge 215 of second lateral surface 214 may have the same diameters.

Specifically, first diameter 211a of first outer edge 213 of first lateral surface 212 may the same as second diameter 211b of second outer edge 215 of second lateral surface 214 as, for example, shown in FIG. 3B. In this example, roller 210 may be symmetrical along the vertical plane extending front to back of roller 210. As a result of the diameters being the same, axis 202 remains substantially parallel to the top surfaces of first part 310 and second part 320 when first part 310 and second part 320 are coplanar. One having ordinary skill in the art would understand that first part 310 and second part 320 may only be coplanar near and along seam 330 or, more specifically, at contact points of roller 210.

Referring generally to FIG. 1 and particularly to, e.g., FIGS. 2A, 2B-1, 2B-2, and 2F, roller 210 further comprises first traction ring 240a and second traction ring 240b. First traction ring 240a separates circumferential surface 216 and first lateral surface 212. Second traction ring 240b separates circumferential surface 216 and second lateral surface 214. Circumferential surface 216 separates first traction ring 240a and second traction ring 240b. The preceding subject matter of this paragraph characterizes example 4 of the present disclosure, wherein example 4 also includes the subject matter according to any one of examples 1 to 3, above.

During operation of applicator 200, roller 210 is rolled over first part 310 and second part 320. If roller 210 does not slip relative to first part 310 and second part 320, then the rotational speed of roller 210 is proportional to the linear speed with which applicator 200 moves relative to first part 310 and second part 320. This correlation of the rotational speed and liner speeds (for the non-slip condition) may be relied on to control the amount of glutinous substance 140 delivered to seam 330. First traction ring 240a and second traction ring 240b of roller 210 help to ensure this non-slip condition. Furthermore, first traction ring 240a and second traction ring 240b may prevent migration of glutinous substance 140 from circumferential surface 216 to first lateral surface 212 and to second lateral surface 214. In other words, first traction ring 240a may seal of first lateral surface 212 from circumferential surface 216 at least when roller 210 contacts first part 310. Likewise, second traction ring 240b may seal of second lateral surface 214 from circumferential surface 216 at least when roller 210 contacts second part 320. As a result, glutinous substance 140 is transferred to first part 310 and second 320 instead of being pushed out to first lateral surface 212 and second lateral surface 214.

First traction ring 240a separates circumferential surface 216 and first lateral surface 212 and may be positioned at first outer edge 213 of first lateral surface 212. First traction ring 240a may protrude beyond first outer edge 213 away from axis 202 such that first traction ring 240a comes in contact with first part 310 before any other part of roller 210 comes in contact with first part 310.

Second traction ring 240b separates circumferential surface 216 and second lateral surface 214 and may be positioned at second outer edge 215 of second lateral surface 214. Second traction ring 240b may protrude beyond second outer edge 215 away from axis 202. As such, second traction ring 240b comes in contact with second part 320 before any other part of roller 210 comes in contact with second part 320.

In some examples, first traction ring 240a may be disposed in ring channel 219 provided within roller 210 as, for example, shown in FIG. 2F. Ring channel 219 is positioned between first lateral surface 212 and circumferential surface 216. Ring channel 219 ensures that first traction ring 240a remains on roller 210 during operation of applicator 200 or, more specifically, as roller 210 rotates relative to housing 220 and relative to first part 310. Specifically, ring channel 219 ensures that first traction ring 240a does not slip of roller 210 or cover circumferential surface 216. Second traction ring 240b may be disposed in a similar channel disposed between circumferential surface 216 and second lateral surface 214.

Referring generally to FIG. 1 and particularly to, e.g., FIG. 2A, first traction ring 240a and second traction ring 240b are coaxial with axis 202. The preceding subject matter of this paragraph characterizes example 5 of the present disclosure, wherein example 5 also includes the subject matter according to example 4, above.

When first traction ring 240a and second traction ring 240b are coaxial with axis 202, first traction ring 240a continuously contacts first part 310 and second traction ring 240b continuously contacts second part 320 while roller 210 rotates relative to housing 220 about axis 202. In other words, both first traction ring 240a and second traction ring 240b continuously contact respective ones of first part 310 and second part 320 at the same time. This simultaneous and continuous contact ensures non-slip conditions, orientation of roller 210 relative to first part 310 and second part 320, and sealing.

First traction ring 240a may be positioned at first outer edge 213 of first lateral surface 212. Second traction ring 240b may be positioned at second outer edge 215 of second lateral surface 214. First outer edge 213 and second outer edge 215 may be coaxial.

Referring generally to FIG. 1 and particularly to, e.g., FIG. 3B, first traction ring 240a and second traction ring 240b are equal in size. The preceding subject matter of this paragraph characterizes example 6 of the present disclosure, wherein example 6 also includes the subject matter according to example 5, above.

During operation of applicator 200, roller 210 is rolled over first part 310 and second part 320. Specifically, first traction ring 240a may be rolled over first part 310, while second traction ring 240b may be rolled over second part 320. To maintain applicator 200 substantially perpendicular to the top surfaces of first part 310 and second part 320 (when first part 310 and second part 320 are coplanar), first traction ring 240a and second traction ring 240b may be equal in size.

First traction ring 240a and second traction ring 240b may be equal in size or, more specifically, first traction ring 240a and second traction ring 240b may have equal outside diameters. In some examples, first traction ring 240a and second traction ring 240b are O-rings and may have the same cross-sectional diameter. Alternatively, first traction ring 240a and second traction ring 240b may be rings with rectangular cross-sections, and both first traction ring 240a and second traction ring 240b may have the same thickness.

In both examples, first traction ring 240a and second traction ring 240b may have the same inside diameter. Alternatively, first traction ring 240a and second traction ring 240b may have different inside diameters even though their outside diameters may be the same.

Referring generally to FIG. 1 and particularly to, e.g., FIGS. 2A and 3A, first traction ring 240a and second traction ring 240b are different in size. The preceding subject matter of this paragraph characterizes example 7 of the present disclosure, wherein example 7 also includes the subject matter according to example 5, above.

During operation of applicator 200, roller 210 is rolled over first part 310 and second part 320. Specifically, first traction ring 240a may be rolled over first part 310, while second traction ring 240b may be rolled over second part 320. First part 310 and second part 320 may not be coplanar. To maintain applicator 200 substantially perpendicular to the top surfaces of first part 310 and second part 320 when top surfaces of first part 310 and second part 320 are not coplanar, first traction ring 240a and second traction ring 240b may be different in size.

In the example shown in FIGS. 2A and 3A, second part 320 is positioned above first part 310. In this example, first traction ring 240a may be larger than second traction ring 240b. More specifically, first traction ring 240a may have a larger outside diameter than second traction ring 240b. In some examples, first traction ring 240a and second traction ring 240b are O-rings and may have the same cross-diameter. Alternatively, first traction ring 240a and second traction ring 240b may be rings with rectangular cross-sections, and both first traction ring 240a and second traction ring 240b may have the same thickness. In both of these examples, first traction ring 240a may have a larger inside diameter than second traction ring 240b.

Referring generally to FIG. 1 and particularly to, e.g., FIGS. 2A, 2B-1, and 2B-2, first traction ring 240a and second traction ring 240b are formed from elastic material, selected from group consisting of rubber, silicone, and polyurethane. The preceding subject matter of this paragraph characterizes example 8 of the present disclosure, wherein example 8 also includes the subject matter according to any one of examples 4 to 7, above.

The elastic material of first traction ring 240a and second traction ring 240b ensures traction of roller 210 maintains continues contact relative to first part 310 and prevents roller 210 from slipping relative to first part 310. For example, the elastic material may compress thereby increasing the contact surface between first traction ring 240a and first part 310 as well as between and second traction ring 240b and second part 320.

First traction ring 240a and second traction ring 240b may be also used to seal areas of first part 310 and second part 320 outside seam 330 from being exposed to glutinous substance 140. Furthermore, the elasticity of first traction ring 240a and second traction ring 240b may be used to change the position of circumferential surface 216 to first part 310 and second part. For example, a gap between circumferential surface 216 and first part 310 an/or second part may be increases or decreases depending on the compression of first traction ring 240a and second traction ring 240b. Finally, the elasticity of first traction ring 240a and second traction ring 240b may be used to accommodate for small variations on the surface of first part 310 and second part 320. First traction ring 240a and second traction ring 240b may be formed from the same material or different materials. For example, first traction ring 240a and/or second traction ring 240b may be formed from rubber. Alternatively, first traction ring 240a and/or second traction ring 240b may be formed from silicone. Furthermore, first traction ring 240a and/or second traction ring 240b may be formed from polyurethane.

Referring generally to FIG. 1 and particularly to, e.g., FIG. 6E, shaper 234 is coextensive with scraper 232. The preceding subject matter of this paragraph characterizes example 9 of the present disclosure, wherein example 9 also includes the subject matter according to any one of examples 1 to 8, above.

The position of shaper 234 and scraper 232 in applicator may coincide as, for example, shown in FIG. 6E. In other words, as soon as glutinous substance 140 is removed from circumferential surface 216 by scraper 232, glutinous substance 140 is immediately shaped into the final form by shaper 234. In this example, fewer components and surfaces are in contact with glutinous substance 140 after removal of glutinous substance 140 from circumferential surface 216.

In some examples, shaper 234 and scraper 232 may be the same component of applicator 200, such as an edge of a structure as shown in FIG. 6E. In some examples, as, for example, shown in FIG. 6F, applicator 200 does not include shaper 234 and scraper 232. In these examples, removal of glutinous substance 140 from circumferential surface 216 of roller 210 is performed when glutinous substance 140 comes in contact with first part 310 and second part 320, which may have higher tackiness for glutinous substance 140 than circumferential surface 216.

Referring generally to FIG. 1 and particularly to, e.g., FIG. 2C and FIGS. 3E-3G, housing 220 further comprises channel 236, extending, inclusively, between scraper 232 and shaper 234. The preceding subject matter of this paragraph characterizes example 10 of the present disclosure, wherein example 10 also includes the subject matter according to any one of examples 1 to 8, above.

Positioning channel 236 between scraper 232 and shaper 234 enables to change the cross-sectional profile of a bead of glutinous substance 140 and/or enhance contact between glutinous substance 140 and first part 310 and second part 320. In other words, the profiles of scraper 232 and shaper 234 may be different.

For example, when glutinous substance 140 is initially removed from circumferential surface 216, the contact between glutinous substance 140 and first part 310 and second part 320 may not be sufficient for sealing, bonding, and other purposes. Passing glutinous substance 140 through channel 236 may enhance this contact by pushing glutinous substance 140 toward first part 310 and second part 320 as glutinous substance 140 goes through channel 236. Furthermore, the shape of glutinous substance 140 may change as glutinous substance 140 goes through channel 236. FIGS. 3E-3G illustrate different cross-sections of channel 236 at different locations, the locations identified in FIG. 2C.

Referring generally to FIG. 1 and particularly to, e.g., FIGS. 2C and FIGS. 3E-3G, channel 236 is shaped differently at shaper 234 than at scraper 232. The preceding subject matter of this paragraph characterizes example 11 of the present disclosure, wherein example 11 also includes the subject matter according to example 10, above.

Channel 236 having a variable shape at scraper 232 and at shaper 234 enables gradual changes to be made to the cross-sectional profile of a bead of glutinous substance 140. As such, adding channel 236 between scraper 232 and shaper 234 enables forming a cross-sectional profile of the bead that is different from the profile, corresponding to scraper 232, which is geometrically complementary at least with non-linear segment 217 of circumferential surface 216.

The cross-section of the bead of glutinous substance 140 at this point of removal from circumferential surface 216 may be substantially same as scraper 232 or non-linear segment 217 of circumferential surface 216. However, when glutinous substance 140 is finally deposited over seam 330, glutinous substance 140 may need to have a different cross-sectional profile. This cross-section is determined by shaper 234. Transition from one cross-section e.g., one of scraper 232 to another cross-section e.g., one of shaper 234 is achieved by channel 236 having variable cross-section. Referring to FIG. 2C and different cross-sections of channel 236 shown in FIGS. 3E-3G, channel 236 may have triangular cross-section adjacent to scraper 232 as, for example, shown in FIG. 3E. This cross-section may gradually change. FIG. 3G illustrates semi-circular cross-section of channel 236 adjacent to shaper 234. FIG. 3F illustrates intermediate cross-section of channel 236 as this cross-section transitions from triangular cross-section to semi-circular cross-section.

Referring generally to FIG. 1 and particularly to, e.g., FIGS. 6A and 6C, scraper 232 is movable relative to roller 210. The preceding subject matter of this paragraph characterizes example 12 of the present disclosure, wherein example 12 also includes the subject matter according to any one of examples 1 to 11, above.

The amount of glutinous substance 140 removed from circumferential surface 216 and deposited over seam 330 is determined by the position of scraper 232 relative to circumferential surface 216. If scraper 232 contacts or is close to circumferential surface 216 such that glutinous substance 140 cannot pass between scraper 232 and circumferential surface 216, then all glutinous substance 140 is removed from circumferential surface 216 by scraper 232 and deposited over seam 330. Positioning scraper 232 away from circumferential surface 216 may allow some glutinous substance 140 be retained on circumferential surface 216 as circumferential surface 216 passes scraper 232.

The position of scraper 232 relative to circumferential surface 216 is one control of the amount of glutinous substance 140 removed circumferential surface 216 by scraper 232. This amount may be changed even when circumferential surface 216 continues to carry the same amount toward scraper 232. FIG. 6A illustrates an example where all or substantially all of glutinous substance 140 is removed from circumferential surface 216 of roller 210. FIG. 6C illustrates another example where some glutinous substance 140 is allowed to be retained on circumferential surface 216 of roller 210. In FIG. 6C, scraper 232 is positioned away from non-linear segment 217 of circumferential surface 216 of roller 210. The remaining portion of glutinous substance 140 is carried back to delivery port 222 where this portion is joined by additional amount of glutinous substance 140, which is then carried back together toward scraper 232. It should be noted that the amount of glutinous substance 140 removed by scraper 232 may control in part the amount of glutinous substance 140 added to circumferential surface 216 from delivery port 222. For example, when more glutinous substance 140 is removed by scraper 232, more glutinous substance 140 is added to circumferential surface 216 from delivery port 222 and vice versa.

Referring generally to FIG. 1 and particularly to, e.g., FIGS. 6A and 6C, shaper 234 is fixed relative to scraper 232. The preceding subject matter of this paragraph characterizes example 13 of the present disclosure, wherein example 13 also includes the subject matter according to example 12, above.

When shaper 234 is fixed relative to scraper 232, any movement of scraper 232 results in the same movement of shaper 234. As such, these positions may be collectively used to control the amount of glutinous substance 140, removed by scraper 232 from circumferential surface 216 (which is based on the position of scraper 232 relative to circumferential surface 216) and the distribution of glutinous substance 140 along seam 330 (which is based on the position of shaper 234 relative to first part 310 and second part 320).

In some examples, shaper 234 and scraper 232 may be parts of the same component, such as receiver 230. For example, shaper 234 and scraper 232 may be parts of a block that is slidably coupled to housing 220 as, for example, schematically, shown in FIGS. 6A and 6C.

Referring generally to FIG. 1 and particularly to, e.g., FIG. 6A, scraper 232 has range of movement relative to roller 210 that is sufficient to selectively establish contact between scraper 232 and circumferential surface 216 of roller 210. The preceding subject matter of this paragraph characterizes example 14 of the present disclosure, wherein example 14 also includes the subject matter according to example 12 or 13, above.

To remove substantially all glutinous substance 140 from circumferential surface 216, scraper 232 may need to contact circumferential surface 216. At the same time, scraper 232 may need to be moved away from circumferential surface 216, if lower amounts of glutinous substance 140 is desired.

For example, scraper 232 may be slidably coupled to housing 220 and can have any selective position relative to circumferential surface 216, including direct contact with circumferential surface 216. The position of scraper 232 relative to circumferential surface 216 may be adjusted as a continuum without any specific increments.

Referring generally to FIG. 1 and particularly to, e.g., FIG. 6A, scraper 232 has range of movement relative to roller 210 that is sufficient to selectively create gap between scraper 232 and circumferential surface 216 of roller 210. The preceding subject matter of this paragraph characterizes example 15 of the present disclosure, wherein example 15 also includes the subject matter according to any one of examples 12 to 14, above.

To remove substantially all glutinous substance 140 from circumferential surface 216, scraper 232 may need to contact circumferential surface 216. At the same time, scraper 232 may need to be moved away from circumferential surface 216, if lower amounts of glutinous substance 140 is desired.

For example, scraper 232 may be slidably coupled to housing 220 and can have any selective position relative to circumferential surface 216, including direct contact with circumferential surface 216. The position of scraper 232 relative to circumferential surface 216 may be adjusted as a continuum without any specific increments.

Referring generally to FIG. 1 and particularly to, e.g., FIG. 6C, scraper 232 has range of movement relative to roller 210 that is sufficient to selectively adjust gap between scraper 232 and circumferential surface 216 of roller 210. The preceding subject matter of this paragraph characterizes example 16 of the present disclosure, wherein example 16 also includes the subject matter according to example 15, above.

The gap between scraper 232 and circumferential surface 216 of roller 210 may be used to control the amount of glutinous substance 140 removed from circumferential surface 216 and deposited over seam 330. The selective adjustment of the gap enables this amount of glutinous substance 140 to be varied.

In some example, only a portion of glutinous substance 140 is removed from circumferential surface 216 by scraper 232 while some glutinous substance 140 is carried on circumferential surface 216 past scraper 232. Specifically, FIG. 6C illustrates an example where a gap exists between scraper 232 and circumferential surface 216 of roller 210 allowing some glutinous substance 140 to be carried on circumferential surface 216 past scraper 232. For example, scraper 232 may be movable within a plane parallel to axis 202 and can form any gap with circumferential surface 216.

Referring generally to FIG. 1 and particularly to, e.g., FIG. 6D, delivery port 222 comprises inner edge 227, movable relative to roller 210 to vary spacing between circumferential surface 216 and inner edge 227. The preceding subject matter of this paragraph characterizes example 17 of the present disclosure, wherein example 17 also includes the subject matter according to any one of examples 1 to 16, above.

The amount of glutinous substance 140 deposited over seam 330 may be also controlled by the amount of glutinous substance 140 carried on circumferential surface 216 to scraper 232. This amount of glutinous substance 140 may be changed. Specifically, the gap between inner edge 227 of delivery port 222 and circumferential surface 216 may be used to control how much of glutinous substance 140 is deposited on circumferential surface 216. To change this amount, the spacing between inner edge 227 and circumferential surface 216 may be adjusted allowing different amounts of glutinous substance 140 to pass through the gap and deposit on circumferential surface 216 and carried to scraper 232.

FIG. 6D illustrates an example of the gap between circumferential surface 216 and inner edge 227 of delivery port 222. In some examples, delivery port 222 in its entirety is movable relative to circumferential surface 216. Alternatively, only a portion of delivery port 222 comprising inner edge 227 may be movable. After glutinous substance 140 passes inner edge 227, no other components of delivery port 222 contact glutinous substance 140 as glutinous substance 140 is being carried by circumferential surface 216. As such, inner edge 227 controls the amount of glutinous substance 140, carried by circumferential surface 216.

Referring generally to FIG. 1 and particularly to, e.g., FIGS. 2A and 2G applicator 200 further comprises bearing 242, rotatably coupling roller 210 and housing 220. The preceding subject matter of this paragraph characterizes example 18 of the present disclosure, wherein example 18 also includes the subject matter according to any one of examples 1 to 17, above.

Bearing 242 enables roller 210 to move freely rotate relative to housing 220 and reduce likelihood of roller 210 slipping relative to first part 310 and second part 320. Specifically, to prevent slippage between roller 210 and first part 310 and/or second part 320, friction between roller 210 and housing 220 should be less than that between roller 210 and, collectively, first part 310 and second part 320.

Bearings 242 may be inserted into roller 210 as, for example, shown in FIG. 2A. In this example, a shaft, coupling roller 210 and housing 220 (through bearings 242), may not be rotatable relative to housing 220. Alternatively, bearings 242 may be inserted into housing 220 as, for example, shown in FIG. 2G. In this example, a shaft, coupling roller 210 and housing 220 (through bearings 242), may be rotatable relative to housing 220 and not rotatable relative to roller 210.

Referring generally to FIG. 1 and particularly to, e.g., FIGS. 6A, 6B-1, and 6I at least 75% of circumferential surface 216 of roller 210 is enclosed within housing 220. The preceding subject matter of this paragraph characterizes example 19 of the present disclosure, wherein example 19 also includes the subject matter according to any one of examples 1 to 18, above.

Enclosing circumferential surface 216 within housing 220 protects glutinous substance 140 from contamination as glutinous substance 140 is being carried on circumferential surface 216. Furthermore, this enclosing may be used to protect circumferential surface 216 when no glutinous substance 140 is present on circumferential surface 216, e.g., when portion of circumferential surface 216 returns from scraper 232 to delivery port 222.

A portion of housing 220 may extend over circumferential surface 216 as, for example, schematically shown in FIGS. 6A and 6B-1. This portion of housing 220 may be at least partially removable to access roller 210 (e.g., during assembly/disassembly, cleaning, maintenance). Alternatively, one or both sides of housing 220 (i.e., sides, facing first lateral surface 212 and second lateral surface 214 of roller 210) may be removable to access roller 210.

Referring generally to FIG. 1 and particularly to, e.g., FIGS. 6A, 6B-2, 6B-3, and 6B-4, at least 75% of circumferential surface 216 of roller 210 is not enclosed within housing 220. The preceding subject matter of this paragraph characterizes example 20 of the present disclosure, wherein example 20 also includes the subject matter according to any one of examples 1 to 18, above.

Exposing circumferential surface 216 may be used to prevent contact between glutinous substance 140 and housing 220 when glutinous substance 140 is carried on circumferential surface 216 from delivery port 222 to scraper 232. For example, if there is contact between glutinous substance 140 and housing 220 when roller 210 rotates, housing 220 may apply drag on glutinous substance 140 and cause glutinous substance 140 to flow relative to circumferential surface 216. This flow may disturb controlled delivery of glutinous substance 140 to seam 330. Furthermore, when circumferential surface 216 is exposed, circumferential surface 216 is more accessible for cleaning and maintenance.

Specifically, housing 220 may not extend over some parts of circumferential surface 216 as, for example, schematically shown in FIGS. 6A and 6B-2, 6B-3, and 6B-4. In some examples, only a portion extending past scraper 232 (and up to delivery port 222 based on the rotation direction of roller 210) is exposed as, for example, schematically shown in FIGS. 6A and 6B-2. This portion may not carry any glutinous substance 140 since glutinous substance 140 is removed by scraper 232. Alternatively, only a portion extending past delivery port 222 (and up to scraper 232 based on the rotation direction of roller 210) is exposed as, for example, schematically shown in FIGS. 6A and 6B-3. This portion carries glutinous substance 140 and any contact between glutinous substance 140 and housing 220 may not desirable. Finally, both portions (before and after scraper 232) may be exposed as, for example, schematically shown in FIGS. 6A and 6B-4.

Referring generally to FIG. 1 and particularly to, e.g., FIGS. 2G and 4A, applicator 200 further comprises encoder 250, operable to measure rotation of roller 210 relative to housing 220. The preceding subject matter of this paragraph characterizes example 21 of the present disclosure, wherein example 21 also includes the subject matter according to any one of examples 1 to 20, above.

Encoder 250 may be used to measure the rotation of roller 210 relative, for example, to housing 220. This rotation corresponds to the rotation of roller 210 relative to first part 310 and second part 320 and, as result, to the linear travel distance of applicator 200 relative to first part 310 and second part 320. As such, the output of encoder 250 may be used to control the amount of glutinous substance 140, supplied to delivery port 222 and eventually reaching seam 330 between to first part 310 and second part 320. For a given cross-sectional area of bead of glutinous substance 140 formed over seam 330, a faster linear travel of applicator 200 will require more glutinous substance 140 to be delivered to seam 330.

Encoder 250 may be positioned on and supported by housing 220 as, for example, shown in FIG. 2G and may be coupled to roller 210 using a shaft. Alternatively, encoder 250 may be positioned away from the shaft and coupled to the shaft using continuous looped conveyor element 251 as, for example, shown in FIG. 4A. Specifically, encoder 250 may be positioned on and supported by glutinous-substance source 110.

Referring generally to FIG. 1 and particularly to, e.g., FIGS. 2G and 4A, housing 220 further comprises pressure sensor 223, arranged to sense pressure of glutinous substance 140 inside housing 220 in space 204 between delivery port 222 of housing 220 and circumferential surface 216 of roller 210. The preceding subject matter of this paragraph characterizes example 22 of the present disclosure, wherein example 22 also includes the subject matter according to any one of examples 1 to 21, above.

Pressure sensor 223 ensures that space 204 between delivery port 222 and circumferential surface 216 is completely filled with glutinous substance 140 during operation of applicator 200. When glutinous substance 140 completely fills space 204, glutinous substance 140 is carried on circumferential surface 216 of roller 210 as a continuous bead with no gaps or voids. As such, the output of pressure sensor 223 may be used to control the delivery of glutinous substance 140 to circumferential surface 216.

Pressure sensor 223 may protrude through housing 220 as, for example, shown in FIG. 2G and 4A. Pressure sensor 223 may be communicatively coupled with system controller 150 of applicator system 100.

Referring generally to FIG. 1 and particularly to, e.g., FIG. 2G, applicator 200 further comprises guide 260, coupled to housing 220 and shaped to engage at least one of first part 310 or second part 320 and to maintain orientation of applicator 200 relative to at least one of first part 310 or second part 320 as applicator 200 is moved relative to first part 310 and second part 320 along seam 330. The preceding subject matter of this paragraph characterizes example 23 of the present disclosure, wherein example 23 also includes the subject matter according to any one of examples 1 to 22, above.

Guide 260 maintains orientation of applicator 200 relative to at least one of first part 310 or second part 320 as applicator 200 is moved relative to first part 310 and second part 320 along seam 330. Specifically, guide 260 enables applicator 200 to advance along seam 330 but prevent applicator 200 from moving in the direction perpendicular to seam 330.

Guide 260 may engage at least one of first part 310 or second part 320 as, for example, shown in FIG. 2G. The design of guide 260 may depend on the design of the part that guide 260 engages. For example, FIG. 2G illustrates second part 320 having a vertical protrusion. In this example, guide 260 comprises a channel slidably engaging this vertical protrusion of second part 320.

Referring generally to FIG. 1 and particularly to, e.g., FIGS. 4A and 4B, applicator system 100, for applying glutinous substance 140 to seam 330 between first part 310 and second part 320, is described. Applicator system 100 comprises applicator 200, glutinous-substance source 110, and system controller 150. Applicator 200 comprises roller 210, comprising first lateral surface 212, second lateral surface 214 opposite of first lateral surface 212, and circumferential surface 216, separating first lateral surface 212 and second lateral surface 214. Applicator 200 further comprises housing 220, comprising delivery port 222, scraper 232, and shaper 234. Roller 210 is coupled to housing 220 and is rotatable relative to housing 220 about axis 202. Housing 220 at least partially encloses circumferential surface 216 of roller 210. Circumferential surface 216 of roller 210 is communicatively coupled with delivery port 222. First lateral surface 212 and second lateral surface 214 are isolated from delivery port 222. An intersection of circumferential surface 216 of roller 210 and virtual plane, passing through axis 202, is non-linear segment 217. Shaper 234 is communicatively coupled with scraper 232. Glutinous-substance source 110 is coupled to delivery port 222 of housing 220 and comprises enclosure 135 to receive glutinous substance 140. System controller 150 is configured to control delivery of glutinous substance 140 from glutinous-substance source 110 to applicator 200. The preceding subject matter of this paragraph characterizes example 24 of the present disclosure.

Applicator system 100 is designed to deliver specific amounts of glutinous substance 140 to seam 330 using roller 210. Glutinous substance 140 is supplied from glutinous-substance source 110 through delivery port 222 to circumferential surface 216. Glutinous substance 140 is then carried on circumferential surface 216 from delivery port 222 to seam 330. System controller 150 is used for controlling various component of applicator system 100 and, in some instances, receiving inputs from these components. More specifically, system controller 150 may control the amount of glutinous substance 140 delivered to circumferential surface 216.

Roller 210 of applicator 200 is one of the controls in applicator system 100 for glutinous substance 140 being delivered to seam 330. Only the amount of glutinous substance 140 carried by circumferential surface 216 of roller 210 can be transferred to seam 330. Either the entire amount of glutinous substance 140 carried by roller 210 is transferred to seam 330 or a portion of this entire amount. The transfer amount may depend on the position of scraper 232 relative to circumferential surface 216. For example, if scraper 232 contacts or substantially contacts circumferential surface 216, such that no glutinous substance 140 can pass between scraper 232 and circumferential surface 216, then the entire amount of glutinous substance 140 carried on circumferential surface 216 is transferred to seam 330. As noted above, scraper 232 is geometrically complementary at least with non-linear segment 217 of circumferential surface 216 of roller 210. Alternatively, if scraper 232 may be spaced apart from circumferential surface 216, such that some amount of glutinous substance 140 can pass between scraper 232 and circumferential surface 216, then some amount of glutinous substance 140 carried on circumferential surface 216 may not be transferred to seam 330. This amount may remain on circumferential surface 216 and carried past scraper 232.

Glutinous substance 140 is delivered through delivery port 222 and transferred to circumferential surface 216, which is communicatively coupled with delivery port 222. The amount of glutinous substance 140 transferred from delivery port 222 to circumferential surface 216 may be controlled by various design aspects of delivery port 222 and circumferential surface 216. Furthermore, this amount may be controlled by various aspects of glutinous-substance source 110 coupled to delivery port 222. System controller 150 is configured to control delivery of glutinous substance 140 from glutinous-substance source 110 to applicator 200. For example, system controller 150 may control the pressure to which glutinous substance 140 in glutinous-substance source 110 is subjected to displace glutinous substance 140 from glutinous-substance source 110 and into delivery port 222. Changing this pressure may change the flow rate of glutinous-substance source 110 to delivery port 222 and, eventually, to circumferential surface 216.

Referring generally to FIG. 1 and particularly to, e.g., FIGS. 2G and 4A, housing 220 of applicator 200 further comprises pressure sensor 223, arranged to sense pressure of glutinous substance 140 inside housing 220 in space 204 between delivery port 222 of housing 220 and circumferential surface 216 of roller 210. System controller 150 controls delivery of glutinous substance 140 from glutinous-substance source 110 to applicator 200 at least based on input received by system controller 150 from pressure sensor 223. The preceding subject matter of this paragraph characterizes example 25 of the present disclosure, wherein example 25 also includes the subject matter according to example 24, above.

Pressure sensor 223 ensures that space 204 between delivery port 222 and circumferential surface 216 is completely filled with glutinous substance 140 during operation of applicator 200 and that glutinous substance 140 carried on circumferential surface 216 of roller 210 is continuous bead with no gaps or voids. Pressure sensor 223 sends output to system controller 150, which may use this output to control glutinous-substance source 110 and/or other components of applicator system 100.

Pressure sensor 223 may protrude through housing 220 as, for example, shown in FIGS. 2G and 4A. Pressure sensor 223 may be communicatively coupled with system controller 150 of applicator system 100.

Referring generally to FIG. 1 and particularly to, e.g., FIGS. 2G and 4A, applicator 200 further comprises encoder 250, operable to measure rotation of roller 210 relative to housing 220. System controller 150 controls delivery of glutinous substance 140 from glutinous-substance source 110 to applicator 200 at least based on input received by system controller 150 from encoder 250. The preceding subject matter of this paragraph characterizes example 26 of the present disclosure, wherein example 26 also includes the subject matter according to example 24 or 25, above.

Encoder 250 measures rotation of roller 210 relative to housing 220, which corresponds to rotation of roller 210 relative to first part 310 and second part 320 and, as result, to linear travel distance of applicator 200 relative to first part 310 and second part 320. As such, output of encoder 250 may be used to control amount of glutinous substance 140, supplied to delivery port 222 and eventually reaching seam 330 between to first part 310 and second part 320. For given cross-sectional area of beam formed over seam 330, faster linear travel of applicator 200 will require more glutinous substance 140 to be delivered to seam 330.

Encoder 250 may be positioned on and supported by housing 220 as, for example, shown in FIG. 2G and may be coupled to roller 210 using a shaft. Alternatively, encoder 250 may be positioned away from the shaft and coupled to the shaft using continuous looped conveyor element 251 as, for example, shown in FIG. 4A. Specifically, encoder 250 may be positioned on and supported by glutinous-substance source 110.

Referring generally to FIG. 1 and particularly to, e.g., FIG. 4A, encoder 250 is fixed to enclosure 135 of glutinous-substance source 110 and roller 210 of applicator 200 is rotationally coupled to encoder 250 via continuous looped conveyor element 251. The preceding subject matter of this paragraph characterizes example 27 of the present disclosure, wherein example 27 also includes the subject matter according to example 26, above.

Positioning encoder 250 on enclosure 135 of glutinous-substance source 110 enables using applicator 200 in smaller spaces. For example, seam 330 may be positioned within a narrow cavity. Furthermore, positioning encoder 250 away from housing 220 and/or roller 210 may be used to prevent contamination of encoder 250 with glutinous substance 140.

To monitor the rotational speed of roller 210, encoder 250 is rotationally coupled to roller 210 of applicator 200 via continuous looped conveyor element 251, such as a belt, a chain, or the like. Continuous looped conveyor element 251 may be removable, e.g., for cleaning glutinous substance 140 from housing 220 and/or roller 210.

Referring generally to FIG. 1 and particularly to, e.g., FIG. 2G, encoder 250 is fixed to housing 220 of applicator 200 and roller 210 of applicator 200 is rotationally coupled to encoder 250. The preceding subject matter of this paragraph characterizes example 28 of the present disclosure, wherein example 28 also includes the subject matter according to example 26, above.

When encoder 250 is fixed to housing 220, encoder 250 may be coupled directly to the shaft, supporting roller 210 relative to housing 220. There is no need for additional couplings or transmission mechanisms. As such, monitoring the rotational speed of roller 210 relative to housing 220 may be more precise.

Encoder 250 may be attached to the exterior surface of housing 220 as, for example, shown in FIG. 2G. Alternatively, encoder 250 may be integrated into housing 220.

Referring generally to FIG. 1 and particularly to, e.g., FIG. 4B, glutinous-substance source 110 further comprises actuator 120 and piston 130, movably coupled to actuator 120. Actuator 120 is operatively coupled to system controller 150, configured to control actuator 120, configured to adjust position of piston 130 within enclosure 135. The preceding subject matter of this paragraph characterizes example 29 of the present disclosure, wherein example 29 also includes the subject matter according to any one of examples 24 to 28, above.

During operation of applicator system 100, system controller 150 may send instructions to actuator 120 to deliver more or less of glutinous substance 140 to delivery port 222 of housing 220. If more glutinous substance 140 is needed, actuator 120 may move piston 130 faster. On other hand, if less glutinous substance 140 is needed, actuator 120 may move piston 130 slower.

Actuator 120 may be an electrical motor, a pneumatic pump or valve, a hydraulic pump or valve, or any other suitable device. Actuator 120 is operable to move piston 130 at a controlled speed and to overcome the resistance that glutinous substance 140 may provide as piston 130 pushes glutinous substance 140 out of enclosure 135 and into delivery port 222. In some examples, enclosure 135 is operable to receive a cartridge comprising glutinous substance 140 and piston 130 is operable to displace glutinous substance 140 out of this cartridge.

Referring generally to FIG. 1 and particularly to, e.g., FIG. 4A, FIG. 4B, and FIGS. 6M and 6N, enclosure 135 comprises front portion 135a, attached to applicator 200 and rear portion 135b, hinged relative to front portion 135a. The preceding subject matter of this paragraph characterizes example 30 of the present disclosure, wherein example 30 also includes the subject matter according to example 29, above.

Front portion 135a and rear portion 135b being hinged relative to each other enables loading of cartridges, containing glutinous substance 140, into enclosure 135. Furthermore, front portion 135a and rear portion 135b being hinged enables enclosure 135 to be folded into a more compact form for storage.

Enclosure 135 may include hinge 137 pivotably connecting front portion 135a and rear portion 135b. This design enables accessing the interior space of enclosure 135, e.g., for loading glutinous substance 140, cleaning, and other purposes. Rear portion 135b may include actuator 120, which slidably supports and actuates piston 130. During operation of applicator system 100, piston 130 may protrude into front portion 135a to displace glutinous substance 140. Before front portion 135a pivots relative to rear portion 135b, piston 130 may be retracted into rear portion 135b as, for example, shown in FIG. 4B. Front portion 135a is connected to applicator 200.

Referring generally to FIG. 1 and particularly to, e.g., FIG. 4B, actuator 120 is fixed inside rear portion 135b of enclosure 135. The preceding subject matter of this paragraph characterizes example 31 of the present disclosure, wherein example 31 also includes the subject matter according to example 30, above.

Enclosure 135 or, more specifically, rear portion 135b may protect actuator 120 from the environment, e.g., from glutinous substance 140.

Actuator 120 may be positioned at a rear end of rear portion 135b and may be accessible when, for example, rear portion 135b is pivoted relative to front portion 135a.

Referring generally to FIG. 1 and particularly to, e.g., FIG. 4B, actuator 120 is fixed to rear portion 135b of enclosure 135 and is outside rear portion 135b. The preceding subject matter of this paragraph characterizes example 32 of the present disclosure, wherein example 32 also includes the subject matter according to example 30, above.

Actuator 120 may be positioned outside enclosure 135, for example, to access actuator 120.

Actuator 120 may be positioned attached to the rear end of rear portion 135b. Piston 130 may be slidably coupled to and actuated by actuator 120 and protrude into front portion 135a.

Referring generally to FIG. 1 and particularly to, e.g., FIGS. 2A, 2B-1, 2B-2, and 2F, roller 210 of applicator 200 further comprises first traction ring 240a and second traction ring 240b. First traction ring 240a separates circumferential surface 216 and first lateral surface 212. Second traction ring 240b separates circumferential surface 216 and second lateral surface 214. Circumferential surface 216 separates first traction ring 240a and second traction ring 240b. The preceding subject matter of this paragraph characterizes example 33 of the present disclosure, wherein example 33 also includes the subject matter according to any one of examples 24 to 32, above.

During operation of applicator 200, roller 210 is rolled over first part 310 and second part 320. If roller 210 does not slip relative to first part 310 and second part 320, then the rotational speed of roller 210 is proportional to the linear speed with which applicator 200 moves relative to first part 310 and second part 320. This correlation of the rotational speed and liner speeds (for the non-slip condition) may be relied on to control the amount of glutinous substance 140 delivered to seam 330. First traction ring 240a and second traction ring 240b of roller 210 help to ensure this non-slip condition. Furthermore, first traction ring 240a and second traction ring 240b may prevent migration of glutinous substance 140 from circumferential surface 216 to first lateral surface 212 and to second lateral surface 214. In other words, first traction ring 240a may seal of first lateral surface 212 from circumferential surface 216 at least when roller 210 contacts first part 310. Likewise, second traction ring 240b may seal of second lateral surface 214 from circumferential surface 216 at least when roller 210 contacts second part 320. As a result, glutinous substance 140 is transferred to first part 310 and second part 320 instead of being pushed out to first lateral surface 212 and second lateral surface 214.

First traction ring 240a separates circumferential surface 216 and first lateral surface 212 and may be positioned at first outer edge 213 of first lateral surface 212. First traction ring 240a may protrude beyond first outer edge 213 away from axis 202 such that first traction ring 240a comes in contact with first part 310 before any other part of roller 210 comes in contact with first part 310.

Second traction ring 240b separates circumferential surface 216 and second lateral surface 214 and may be positioned at second outer edge 215 of second lateral surface 214. Second traction ring 240b may protrude beyond second outer edge 215 away from axis 202. As such. second traction ring 240b comes in contact with second part 320 before any other part of roller 210 comes in contact with second part 320.

In some examples, first traction ring 240a may be disposed in ring channel 219 provided within roller 210 as, for example, shown in FIG. 2F. Ring channel 219 is positioned between first lateral surface 212 and circumferential surface 216. Ring channel 219 ensures that first traction ring 240a remains on roller 210 during operation of applicator 200 or, more specifically, as roller 210 rotates relative to housing 220 and relative to first part 310. Specifically, ring channel 219 ensures that first traction ring 240a does not slip of roller 210 or cover circumferential surface 216. Second traction ring 240b may be disposed in a similar channel disposed between circumferential surface 216 and second lateral surface 214.

Referring generally to FIG. 1 and particularly to, e.g., FIG. 2A, first traction ring 240a and second traction ring 240b of roller 210 are coaxial with axis 202. The preceding subject matter of this paragraph characterizes example 34 of the present disclosure, wherein example 34 also includes the subject matter according to example 33, above.

When first traction ring 240a and second traction ring 240b are coaxial with axis 202, first traction ring 240a continuously contacts first part 310 and second traction ring 240b continuously contacts second part 320 while roller 210 rotates relative to housing 220 about axis 202. In other words, both first traction ring 240a and second traction ring 240b continuously contact respective ones of first part 310 and second part 320 at the same time. This simultaneous and continuous contact ensures non-slip conditions, orientation of roller 210 relative to first part 310 and second part 320, and sealing.

First traction ring 240a may be positioned at first outer edge 213 of first lateral surface 212. Second traction ring 240b may be positioned at second outer edge 215 of second lateral surface 214. First outer edge 213 and second outer edge 215 may be coaxial.

Referring generally to FIG. 1 and particularly to, e.g., FIG. 3B, first traction ring 240a and second traction ring 240b of roller 210 are equal in size. The preceding subject matter of this paragraph characterizes example 35 of the present disclosure, wherein example 35 also includes the subject matter according to example 34, above.

During operation of applicator 200, roller 210 is rolled over first part 310 and second part 320. Specifically, first traction ring 240a may be rolled over first part 310, while second traction ring 240b may be rolled over second part 320. To maintain applicator 200 substantially perpendicular to the top surfaces of first part 310 and second part 320 (when first part 310 and second part 320 are coplanar), first traction ring 240a and second traction ring 240b may be equal in size.

First traction ring 240a and second traction ring 240b may be equal in size or, more specifically, first traction ring 240a and second traction ring 240b may have equal outside diameters. In some examples, first traction ring 240a and second traction ring 240b are O-rings and may have the same cross-sectional diameter. Alternatively, first traction ring 240a and second traction ring 240b may be rings with rectangular cross-sections, and both first traction ring 240a and second traction ring 240b may have the same thickness. In both examples, first traction ring 240a and second traction ring 240b may have the same inside diameter. Alternatively, first traction ring 240a and second traction ring 240b may have different inside diameters even though their outside diameters may be the same.

Referring generally to FIG. 1 and particularly to, e.g., FIGS. 2A and 3A, first traction ring 240a and second traction ring 240b of roller 210 are different in size. The preceding subject matter of this paragraph characterizes example 36 of the present disclosure, wherein example 36 also includes the subject matter according to example 34, above.

During operation of applicator 200, roller 210 is rolled over first part 310 and second part 320. Specifically, first traction ring 240a may be rolled over first part 310, while second traction ring 240b may be rolled over second part 320. First part 310 and second part 320 may not be coplanar. To maintain applicator 200 substantially perpendicular to the top surfaces of first part 310 and second part 320 when top surfaces of first part 310 and second part 320 are not coplanar, first traction ring 240a and second traction ring 240b may be different in size.

In the example shown in FIGS. 2A and 3A, second part 320 is positioned above first part 310. In this example, first traction ring 240a may be larger than second traction ring 240b. More specifically, first traction ring 240a may have a larger outside diameter than second traction ring 240b. In some examples, first traction ring 240a and second traction ring 240b are O-rings and may have the same cross-diameter. Alternatively, first traction ring 240a and second traction ring 240b may be rings with rectangular cross-sections, and both first traction ring 240a and second traction ring 240b may have the same thickness. In both of these examples, first traction ring 240a may have a larger inside diameter than second traction ring 240b.

Referring generally to FIG. 1 and particularly to, e.g., FIG. 2A, scraper 232 is geometrically complementary with non-linear segment 217 of circumferential surface 216 of roller 210. The preceding subject matter of this paragraph characterizes example 37 of the present disclosure, wherein example 37 also includes the subject matter according to any one of examples 24 to 36, above.

Scraper 232, being geometrically complementary with non-linear segment 217 of circumferential surface 216, removes at least a portion of glutinous substance 140 from circumferential surface 216 and directs glutinous substance 140 to seam 330 as applicator 200 moves along seam 330. The position of scraper 232 relative to circumferential surface 216 may be used for controlling the amount of glutinous substance 140 transferred from circumferential surface 216 to seam 330.

The transfer amount may depend on the position of scraper 232 relative to circumferential surface 216. For example, if scraper 232 contacts or substantially contacts circumferential surface 216, such that no glutinous substance 140 can pass between scraper 232 and circumferential surface 216, then the entire amount of glutinous substance 140 carried on circumferential surface 216 is transferred to seam 330. As noted above, scraper 232 is geometrically complementary at least with non-linear segment 217 of circumferential surface 216 of roller 210. Alternatively, if scraper 232 is spaced apart from circumferential surface 216, such that some amount of glutinous substance 140 can pass between scraper 232 and circumferential surface 216, then this amount of glutinous substance 140 (which passes between scraper 232 and circumferential surface 216) may not be transferred to seam 330. Instead, this amount remains on circumferential surface 216 and carried past scraper 232 to delivery port 222.

Referring generally to FIG. 1 and particularly to, e.g., FIG. 2C and FIGS. 3E-3G, housing 220 of applicator 200 further comprises channel 236, extending, inclusively, between scraper 232 and shaper 234. The preceding subject matter of this paragraph characterizes example 38 of the present disclosure, wherein example 38 also includes the subject matter according to example 37, above.

Positioning channel 236 between scraper 232 and shaper 234 enables to change the cross-sectional profile of a bead of glutinous substance 140 and/or to enhance contact between glutinous substance 140 and first part 310 and second part 320. In other words, the profile of scraper 232 and shaper 234 may be different.

For example, when glutinous substance 140 is initially removed from circumferential surface 216, the contact between glutinous substance 140 and first part 310 and second part 320 may not be sufficient for sealing, bonding, and other purposes. Passing glutinous substance 140 through channel 236 may enhance this contact by pushing glutinous substance 140 toward first part 310 and second part 320 as glutinous substance 140 goes through channel 236. Furthermore, the shape of glutinous substance 140 may change as glutinous substance 140 goes through channel 236. FIGS. 3E-3G illustrate different cross-sections of the channel 236 at different locations, the locations identified in FIG. 2C.

Referring generally to FIG. 1 and particularly to, e.g., FIGS. 2C and 3E-3G, channel 236 is shaped differently at shaper 234 than at scraper 232. The preceding subject matter of this paragraph characterizes example 39 of the present disclosure, wherein example 39 also includes the subject matter according to example 38, above.

Channel 236 having a variable shape at scraper 232 and at shaper 234 enables gradual changes to the cross-sectional profile of a bead of glutinous substance 140. As such, adding channel 236 between scraper 232 and shaper 234 enables forming a cross-sectional profile of the bead that is different from the profile, corresponding to scraper 232, which is geometrically complementary at least with non-linear segment 217 of circumferential surface 216.

The cross-section of the bead of glutinous substance 140 at this point of removal from circumferential surface 216 may be substantially same as scraper 232 or non-linear segment 217 of circumferential surface 216. However, when glutinous substance 140 is finally deposited over seam 330, glutinous substance 140 may need to have a different cross-sectional profile. This cross-section is determined by shaper 234. Transition from one cross-section e.g., one of scraper 232 to another cross-section e.g., one of shaper 234 is achieved by channel 236 having variable cross-section. Referring to FIG. 2C and different cross-sections of channel 236 shown in FIGS. 3E-3G, channel 236 may have triangular cross-section adjacent to scraper 232 as, for example, shown in FIG. 3E. This cross-section may gradually change. FIG. 3G illustrates semi-circular cross-section of channel 236 adjacent to shaper 234. FIG. 3F illustrates intermediate cross-section of channel 236 as this cross-section transitions from triangular cross-section to semi-circular cross-section.

Referring generally to FIG. 1 and particularly to, e.g., FIGS. 6A and 6C, scraper 232 is movable relative to roller 210. The preceding subject matter of this paragraph characterizes example 40 of the present disclosure, wherein example 40 also includes the subject matter according to any one of examples 37 to 39, above.

The amount of glutinous substance 140 removed from circumferential surface 216 and deposited over seam 330 is determined by the position of scraper 232 relative to circumferential surface 216. If scraper 232 contacts or is close to circumferential surface 216 such that glutinous substance 140 cannot pass between scraper 232 and circumferential surface 216, then all glutinous substance 140 is removed from circumferential surface 216 by scraper 232 and deposited over seam 330. Positioning scraper 232 away from circumferential surface 216 may allow some glutinous substance 140 be retained on circumferential surface 216 as circumferential surface 216 passes scraper 232.

The position of scraper 232 relative to circumferential surface 216 is one control of the amount of glutinous substance 140 removed circumferential surface 216 by scraper 232. This amount may be changed even when circumferential surface 216 continues to carry the same amount toward scraper 232. FIG. 6A illustrates example where all or substantially all of glutinous substance 140 is removed from circumferential surface 216 of roller 210. FIG. 6C illustrates another example where some glutinous substance 140 is allowed to be retained on circumferential surface 216 of roller 210. In FIG. 6C, scraper 232 is positioned away from non-linear segment 217 of circumferential surface 216 of roller 210. The remaining portion of glutinous substance 140 is carried back to delivery port 222 where this portion is joined by additional amount of glutinous substance 140, which is then carried back together toward scraper 232. It should be noted that the amount of glutinous substance 140 removed by scraper 232 may control in part the amount of glutinous substance 140 added to circumferential surface 216 from delivery port 222. For example, when more glutinous substance 140 is removed by scraper 232, more glutinous substance 140 is added to circumferential surface 216 from delivery port 222 and vice versa.

Referring generally to FIG. 1 and particularly to, e.g., FIGS. 6A and 6C, shaper 234 is fixed relative to scraper 232. The preceding subject matter of this paragraph characterizes example 41 of the present disclosure, wherein example 41 also includes the subject matter according to any one of examples 37 to 40, above.

When shaper 234 is fixed relative to scraper 232, any movement of scraper 232 results in the same movement of shaper 234. As such, these positions may be collectively used to control the amount of glutinous substance 140 removed by scraper 232 from circumferential surface 216 (which is based on the position of scraper 232 relative to circumferential surface 216) and the distribution of glutinous substance 140 on seam 330 (which is based on the position of shaper 234 relative to first part 310 and second part 320).

In some examples, shaper 234 and scraper 232 may be parts of the same component, such as receiver 230. For example, shaper 234 and scraper 232 may be parts of a block that is slidably coupled to housing 220 as, for example, schematically, shown in FIGS. 6A and 6C.

Referring generally to FIG. 1 and particularly to, e.g., FIG. 6A, scraper 232 has range of movement relative to roller 210 that is sufficient to selectively establish contact between scraper 232 and circumferential surface 216 of roller 210. The preceding subject matter of this paragraph characterizes example 42 of the present disclosure, wherein example 42 also includes the subject matter according to any one of examples 37 to 41, above.

To remove substantially all glutinous substance 140 from circumferential surface 216, scraper 232 may need to contact circumferential surface 216. At the same time, scraper 232 may need to be moved away from circumferential surface 216, if lower amounts of glutinous substance 140 is desired.

For example, scraper 232 may be slidably coupled to housing 220 and can have any selective position relative to circumferential surface 216, including direct contact with circumferential surface 216. The position of scraper 232 relative to circumferential surface 216 may be adjusted as a continuum without any specific increments.

Referring generally to FIG. 1 and particularly to, e.g., FIG. 6A, scraper 232 has range of movement relative to roller 210 that is sufficient to selectively create gap between scraper 232 and circumferential surface 216 of roller 210. The preceding subject matter of this paragraph characterizes example 43 of the present disclosure, wherein example 43 also includes the subject matter according to any one of examples 37 to 42, above.

To remove substantially all glutinous substance 140 from circumferential surface 216, scraper 232 may need to contact circumferential surface 216. At the same time, scraper 232 may need to be moved away from circumferential surface 216, if lower amounts of glutinous substance 140 is desired.

For example, scraper 232 may be slidably coupled to housing 220 and can have any selective position relative to circumferential surface 216, including direct contact with circumferential surface 216. The position of scraper 232 relative to circumferential surface 216 may be adjusted as a continuum without any specific increments.

Referring generally to FIG. 1 and particularly to, e.g., FIG. 6A, scraper 232 is sufficiently movable relative to roller 210 to selectively adjust gap between scraper 232 and circumferential surface 216 of roller 210. The preceding subject matter of this paragraph characterizes example 44 of the present disclosure, wherein example 44 also includes the subject matter according to example 43, above.

To remove substantially all glutinous substance 140 from circumferential surface 216, scraper 232 may need to contact circumferential surface 216. At the same time, scraper 232 may need to be moved away from circumferential surface 216, if lower amounts of glutinous substance 140 is desired.

For example, scraper 232 may be slidably coupled to housing 220 and can have any selective position relative to circumferential surface 216, including direct contact with circumferential surface 216. The position of scraper 232 relative to circumferential surface 216 may be adjusted as a continuum without any specific increments.

Referring generally to FIG. 1 and particularly to, e.g., FIG. 6D, delivery port 222 of housing 220 comprises inner edge 227, movable relative to roller 210 to vary spacing 221 between circumferential surface 216 of roller 210 and inner edge 227 of housing 220. The preceding subject matter of this paragraph characterizes example 45 of the present disclosure, wherein example 45 also includes the subject matter according to any one of examples 22 to 44, above.

The amount of glutinous substance 140 deposited over seam 330 may be also controlled by the amount of glutinous substance 140 carried on circumferential surface 216 to scraper 232. This amount of glutinous substance 140 may be changed. Specifically, the gap between inner edge 227 of delivery port 222 and circumferential surface 216 may be used to control how much of glutinous substance 140 is deposited on circumferential surface 216. To change this amount, the spacing between inner edge 227 and circumferential surface 216 may be adjusted allowing different amounts of glutinous substance 140 to pass through the gap and deposit on circumferential surface 216 and carried to scraper 232.

FIG. 6D illustrates an example of the gap between circumferential surface 216 and inner edge 227 of delivery port 222. In some examples, delivery port 222 in its entirety is movable relative to circumferential surface 216. Alternatively, only a portion of delivery port 222 comprising inner edge 227 may be movable. It should be noted that inner edge 227 is the past component of delivery port 222 contacting glutinous substance 140 before glutinous substance 140 is carried by circumferential surface 216. After glutinous substance 140 passes inner edge 227, no other components of delivery port 222 contact glutinous substance 140 as glutinous substance 140 is being carried by circumferential surface 216. As such, inner edge 227controls the amount of glutinous substance 140 carried by circumferential surface 216.

Referring generally to FIG. 1 and particularly to, e.g., FIGS. 6A, 6B-1, and 6I, at least 75% of circumferential surface 216 is enclosed within housing 220. The preceding subject matter of this paragraph characterizes example 46 of the present disclosure, wherein example 46 also includes the subject matter according to any one of examples 24 to 45, above.

Enclosing circumferential surface 216 within housing 220 protects glutinous substance 140 from contamination as glutinous substance 140 is being carried on circumferential surface 216. Furthermore, this enclosing may be used to protect circumferential surface 216 when no glutinous substance 140 is present on circumferential surface 216, e.g., when portion of circumferential surface 216 returns from scraper 232 to delivery port 222.

A portion of housing 220 may extend over circumferential surface 216 as, for example, schematically shown in FIGS. 6A and 6B-1. This portion of housing 220 may be at least partially removable to access roller 210 (e.g., during assembly/disassembly, cleaning, maintenance). Alternatively, one or both sides of housing 220 (i.e., sides, facing first lateral surface 212 and second lateral surface 214 of roller 210) may be removable to access roller 210.

Referring generally to FIG. 1 and particularly to, e.g., FIGS. 6A, 6B-2, 6B-3, and 6B-4, at least 75% of circumferential surface 216 is not enclosed within housing 220. The preceding subject matter of this paragraph characterizes example 47 of the present disclosure, wherein example 47 also includes the subject matter according to any one of examples 24 to 45, above.

Exposing circumferential surface 216 may be used to prevent contact between glutinous substance 140 and housing 220 when glutinous substance 140 is carried on circumferential surface 216 from delivery port 222 to scraper 232. For example, if there is contact between glutinous substance 140 and housing 220 when roller 210 rotates, housing 220 may apply drag on glutinous substance 140 and cause glutinous substance 140 to flow relative to circumferential surface 216. This flow may disturb controlled delivery of glutinous substance 140 to seam 330. Furthermore, when circumferential surface 216 is exposed, circumferential surface 216 is more accessible for cleaning and maintenance.

Specifically, housing 220 may not extend over some parts of circumferential surface 216 as, for example, schematically shown in FIGS. 6A and 6B-2, 6B-3, and 6B-4. In some examples, only a portion extending past scraper 232 (and up to delivery port 222 based on the rotation direction of roller 210) is exposed as, for example, schematically shown in FIGS. 6A and 6B-2. This portion may not carry any glutinous substance 140 since glutinous substance 140 is removed by scraper 232. Alternatively, only a portion extending past delivery port 222 (and up to scraper 232 based on the rotation direction of roller 210) is exposed as, for example, schematically shown in FIGS. 6A and 6B-3. This portion carries glutinous substance 140 and any contact between glutinous substance 140 and housing 220 may not desirable. Finally, both portions (before and after scraper 232) may be exposed as, for example, schematically shown in FIGS. 6A and 6B-4.

Also provided is method 500 of applying glutinous substance 140 to seam 330 between first part 310 and second part 320 as shown in FIG. 5. Method 500 comprises supplying glutinous substance 140 into delivery port 222 of applicator 200 during operation 520. Applicator 200 may comprise roller 210 and housing 220. Roller 210 is coupled to housing 220 and is rotatable relative to housing 220 about axis 202. Circumferential surface 216 of roller 210 is communicatively coupled with delivery port 222 of housing 220. The intersection of circumferential surface 216 of roller 210 and virtual plane, passing through axis 202, is non-linear segment 217. During operation 520, glutinous substance 140 contacts and tacks onto circumferential surface 216. In some examples, supplying glutinous substance 140 into delivery port 222 comprises monitoring pressure between delivery port 222 and circumferential surface 216 and controlling amount of glutinous substance 140 supplied into delivery port 222 based on pressure between delivery port 222 and circumferential surface 216.

Method 500 may proceed with rotating roller 210 on first part 310 and second part 320, over seam 330, relative to housing 220, during operation 530. During this operation, glutinous substance 140 is carried on circumferential surface 216 of roller 210 from delivery port 222 to seam 330. In some examples, rotating roller 210 on first part 310 and second part 320 comprises controlling orientation of roller 210 relative to seam 330 along seam 330. Furthermore, rotating roller 210 on first part 310 and second part 320 comprises monitoring rotation speed of roller 210 relative to housing 220 and controlling how much of glutinous substance 140 is supplied into delivery port 222 based on rotation speed.

Method 500 involves removing at least portion of glutinous substance 140 from circumferential surface 216 of roller 210 during operation 540. For example, at least portion of glutinous substance 140 may be removed from circumferential surface 216 of roller 210 using scraper 232 of housing 220. In some examples, removing at least portion of glutinous substance 140 from circumferential surface 216 of roller 210 comprises changing position of scraper 232 of housing 220 relative to circumferential surface 216 during operation 542. In some examples, all glutinous substance 140 is removed from circumferential surface 216 of roller 210 during operation 540. Furthermore, a portion of glutinous substance 140 removed from circumferential surface 216 of roller 210 may be variable overtime.

Method 500 also involves applying glutinous substance 140 in form of bead 145 over seam 330 during operation 550. In some examples, applying glutinous substance 140 to seam 330 comprises shaping top surface of bead 145 using shaper 234 of housing 220 during operation 552.

Examples of the present disclosure may be described in the context of aircraft manufacturing and service method 1100 as shown in FIG. 7 and aircraft 1102 as shown in FIG. 8. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An applicator for applying a glutinous substance to a seam between a first part and a second part, the applicator comprising:
   a roller, comprising a first lateral surface, a second lateral surface opposite of the first lateral surface, and a circumferential surface, separating the first lateral surface and the second lateral surface; and
   a housing, comprising a delivery port, a scraper, and a shaper;
   and wherein:
      the roller is coupled to the housing and is rotatable relative to the housing about an axis;
      the housing at least partially encloses the circumferential surface of the roller;
      the circumferential surface of the roller is fluidly communicatively coupled with the delivery port;
      the first lateral surface and the second lateral surface are isolated from the delivery port;
      an intersection of the circumferential surface of the roller and any virtual plane, containing the axis, is a non-linear segment;
      the scraper is geometrically complementary at least with the non-linear segment of the circumferential surface of the roller; and
      the shaper is fluidically communicatively coupled with the scraper.

2. The applicator according to claim 1, wherein:
   the first lateral surface comprises a first outer edge, having a first diameter,
   the second lateral surface comprises a second outer edge, having a second diameter, and
   the first diameter is different from the second diameter.

3. The applicator according to claim 1, wherein:
   the first lateral surface comprises a first outer edge, having a first diameter,
   the second lateral surface comprises a second outer edge, having a second diameter, and
   the first diameter is identical to the second diameter.

4. The applicator according to claim 1, wherein:
the roller further comprises:
a first traction ring, separating the circumferential surface and the first lateral surface, and
a second traction ring, separating the circumferential surface and the second lateral surface, and
wherein the circumferential surface separates the first traction ring and the second traction ring.

5. The applicator according to claim 4, wherein the first traction ring and the second traction ring are coaxial with the axis.

6. The applicator according to claim 5, wherein the first traction ring and the second traction ring are equal in size.

7. The applicator according to claim 5, wherein the first traction ring and the second traction ring are different in size.

8. The applicator according to claim 4, wherein the first traction ring and the second traction ring are formed from an elastic material selected from the group consisting of rubber, silicone, and polyurethane.

9. The applicator according to claim 1, wherein the shaper is coextensive with the scraper.

10. The applicator according to claim 1, wherein the housing further comprises a channel, extending, inclusively, between the scraper and the shaper.

11. The applicator according to claim 10, wherein the channel is shaped differently at the shaper than at the scraper.

12. The applicator according to claim 1, wherein the scraper is movable relative to the roller.

13. The applicator according to claim 12, wherein the shaper is fixed relative to the scraper.

14. The applicator according to claim 12, wherein the scraper has a range of movement relative to the roller that is sufficient to selectively establish contact between the scraper and the circumferential surface of the roller.

15. The applicator according to claim 12, wherein the scraper has a range of movement relative to the roller that is sufficient to selectively create a gap between the scraper and the circumferential surface of the roller.

16. The applicator according to claim 15, wherein the scraper has the range of movement relative to the roller that is sufficient to selectively adjust the gap between the scraper and the circumferential surface of the roller.

17. The applicator according to claim 1, wherein the delivery port comprises an inner edge, movable relative to the roller to vary spacing between the circumferential surface and the inner edge.

18. The applicator according to claim 1, further comprising an encoder, operable to measure rotation of the roller relative to the housing.

19. The applicator according to claim 1, wherein the housing further comprises a pressure sensor, arranged to sense pressure of the glutinous substance inside the housing in a space between the delivery port of the housing and the circumferential surface of the roller.

20. The applicator according to claim 1, further comprising a guide, coupled to the housing and shaped to engage at least one of the first part or the second part and to maintain orientation of the applicator relative to at least one of the first part or the second part as the applicator is moved relative to the first part and the second part along the seam.

21. The applicator according to claim 1, further comprising a bearing, rotatably coupling the roller and the housing.

22. The applicator according to claim 1, wherein at least 75% of the circumferential surface of the roller is enclosed within the housing.

23. The applicator according to claim 1, wherein at least 75% of the circumferential surface of the roller is not enclosed within the housing.

24. An applicator system for applying a glutinous substance to a seam between a first part and a second part, the applicator system comprising:
an applicator comprising:
a roller, comprising a first lateral surface, a second lateral surface opposite of the first lateral surface, and a circumferential surface, separating the first lateral surface and the second lateral surface; and
a housing, comprising a delivery port, a scraper, and a shaper; and wherein:
the roller is coupled to the housing and is rotatable relative to the housing about an axis;
the housing at least partially encloses the circumferential surface of the roller;
the circumferential surface of the roller is fluidly communicatively coupled with the delivery port;
the first lateral surface and the second lateral surface are isolated from the delivery port;
an intersection of the circumferential surface of the roller and any virtual plane, containing the axis, is a non-linear segment;
the shaper is fluidically communicatively coupled with the scraper;
a glutinous-substance source, coupled to the delivery port of the housing and comprising an enclosure to receive the glutinous substance; and
a system controller configured to control delivery of the glutinous substance from the glutinous-substance source to the applicator.

25. The applicator system according to claim 11, wherein:
the housing of the applicator further comprises a pressure sensor, arranged to sense pressure of the glutinous substance inside the housing in a space between the delivery port of the housing and the circumferential surface of the roller; and
the system controller controls the delivery of the glutinous substance from the glutinous-substance source to the applicator at least based on input received by the system controller from the pressure sensor.

26. The applicator system according to claim 11, wherein:
the applicator further comprises an encoder, operable to measure rotation of the roller relative to the housing; and
wherein the system controller controls the delivery of the glutinous substance from the glutinous-substance source to the applicator at least based on input received by the system controller from the encoder.

27. The applicator system according to claim 26, wherein the encoder is fixed to the enclosure of the glutinous-substance source and the roller of the applicator is rotationally coupled to the encoder via a continuous looped conveyor element.

28. The applicator system according to claim 26, wherein the encoder is fixed to the housing of the applicator and the roller of the applicator is rotationally coupled to the encoder.

29. The applicator system according to claim 11, wherein:
the glutinous-substance source further comprises an actuator and a piston, movably coupled to the actuator; and
the actuator is operatively coupled to the system controller, configured to control the actuator, configured to adjust position of the piston within the enclosure.

30. The applicator system according to claim 29, wherein: the enclosure comprises a front portion, attached to the applicator and a rear portion, hinged relative to the front portion.

31. The applicator system according to claim 30, wherein the actuator is fixed inside the rear portion of the enclosure.

32. The applicator system according to claim 30, wherein the actuator is fixed to the rear portion of the enclosure and is outside the rear portion.

33. The applicator system according to claim 24, wherein: the roller of the applicator further comprises:
   a first traction ring, separating the circumferential surface and the first lateral surface, and
   a second traction ring, separating the circumferential surface and the second lateral surface, and
   wherein the circumferential surface separates the first traction ring and the second traction ring.

34. The applicator system according to claim 33, wherein the first traction ring and the second traction ring of the roller are coaxial with the axis.

35. The applicator system according to claim 34, wherein the first traction ring and the second traction ring of the roller are equal in size.

36. The applicator system according to claim 34, wherein the first traction ring and the second traction ring of the roller are different in size.

37. The applicator system according to claim 11, wherein the scraper is geometrically complementary with the non-linear segment of the circumferential surface of the roller.

38. The applicator system according to claim 37, wherein the housing of the applicator further comprises a channel, extending, inclusively, between the scraper and the shaper.

39. The applicator system according to claim 38, wherein the channel is shaped differently at the shaper than at the scraper.

40. The applicator system according to claim 37, wherein the scraper is movable relative to the roller.

41. The applicator system according to claim 37, wherein the shaper is fixed relative to the scraper.

42. The applicator system according to claim 37, wherein the scraper has a range of movement relative to the roller that is sufficient to selectively establish contact between the scraper and the circumferential surface of the roller.

43. The applicator system according to claim 37, wherein the scraper has a range of movement relative to the roller that is sufficient to selectively create a gap between the scraper and the circumferential surface of the roller.

44. The applicator system according to claim 43, wherein the scraper is sufficiently movable relative to the roller to selectively adjust the gap between the scraper and the circumferential surface of the roller.

45. The applicator system according to claim 24, wherein the delivery port of the housing comprises an inner edge, movable relative to the roller to vary spacing between the circumferential surface of the roller and the inner edge of the housing.

46. The applicator system according to claim 24, wherein at least 75% of the circumferential surface is enclosed within the housing.

47. The applicator system according to claim 24, wherein east 75% of the circumferential surface is not enclosed within the housing.

* * * * *